(12) United States Patent
Mackin

(10) Patent No.: US 10,981,660 B2
(45) Date of Patent: Apr. 20, 2021

(54) HYBRID PROPULSION ENGINES FOR AIRCRAFT

(71) Applicant: The Boeing Company, Chicago, IL (US)

(72) Inventor: Steve G. Mackin, Bellevue, WA (US)

(73) Assignee: The Boeing Company, Chicago, IL (US)

(*) Notice: Subject to any disclaimer, the term of this patent is extended or adjusted under 35 U.S.C. 154(b) by 277 days.

(21) Appl. No.: 15/957,557

(22) Filed: Apr. 19, 2018

(65) Prior Publication Data

US 2019/0322379 A1    Oct. 24, 2019

(51) Int. Cl.
| | |
|---|---|
| *B64D 31/06* | (2006.01) |
| *B64D 27/10* | (2006.01) |
| *B64D 27/16* | (2006.01) |
| *B64D 27/24* | (2006.01) |
| *B64D 33/02* | (2006.01) |
| *F01D 17/16* | (2006.01) |
| *F02C 7/057* | (2006.01) |

(Continued)

(52) U.S. Cl.
CPC ............ *B64D 31/06* (2013.01); *B64D 27/10* (2013.01); *B64D 27/16* (2013.01); *B64D 27/24* (2013.01); *B64D 33/02* (2013.01); *F01D 17/162* (2013.01); *F02C 7/057* (2013.01); *F02C 9/20* (2013.01); *B64D 2027/026* (2013.01); *B64D 2033/0286* (2013.01); *B64D 2033/0293* (2013.01); *F05D 2220/323* (2013.01); *F05D 2240/12* (2013.01)

(58) Field of Classification Search
CPC .. B64D 27/10; B64D 2027/026; B64D 33/02; B64D 2033/0266; B64D 2033/0273; B64D 2033/0286; B64D 2033/0293
See application file for complete search history.

(56) References Cited

U.S. PATENT DOCUMENTS

| | | |
|---|---|---|
| 7,111,462 B2 | 9/2006 | Epstein |
| 7,183,942 B2 | 2/2007 | Rock et al. |
| 7,421,334 B2 | 9/2008 | Dahlgren et al. |

(Continued)

FOREIGN PATENT DOCUMENTS

| | | |
|---|---|---|
| DE | 102004034657 | 2/2005 |
| DE | 102013209538 | 11/2014 |

(Continued)

OTHER PUBLICATIONS

European Patent Office, "Extended European Search Report", issued in connection with application No. 19160326.5 dated Aug. 9, 2019, 7 pages.

(Continued)

*Primary Examiner* — Richard G Davis
(74) *Attorney, Agent, or Firm* — Hanley, Flight & Zimmerman, LLC

(57) ABSTRACT

Hybrid propulsion engines for aircraft are described herein. An example hybrid propulsion engine includes a propulsor and a gas turbine engine to drive the propulsor during a first mode of operation. The gas turbine engine has a core air intake. The hybrid propulsion engine also includes an electric motor to drive the propulsor during a second mode of operation and a damper disposed in the core air intake of the gas turbine engine to block airflow through the core air intake during the second mode of operation.

20 Claims, 13 Drawing Sheets

(51) Int. Cl.
*F02C 9/20* (2006.01)
*B64D 27/02* (2006.01)

(56) References Cited

U.S. PATENT DOCUMENTS

| | | | |
|---|---|---|---|
| 7,432,800 | B2 | 10/2008 | Harter, Jr. et al. |
| 7,589,643 | B2 | 9/2009 | Dagci et al. |
| 9,878,796 | B2 | 1/2018 | Sheridan |
| 2007/0101721 | A1 | 5/2007 | Dooley et al. |
| 2009/0320440 | A1 | 12/2009 | Erickson et al. |
| 2010/0219779 | A1 | 9/2010 | Bradbrook |
| 2012/0025032 | A1 | 2/2012 | Hopdjanian et al. |
| 2014/0305127 | A1 | 10/2014 | Schroder et al. |
| 2017/0167496 | A1 | 6/2017 | Klosinski et al. |
| 2017/0211474 | A1 | 7/2017 | Sennoun |
| 2017/0292523 | A1* | 10/2017 | Niergarth ............ B64D 27/24 |
| 2017/0320584 | A1 | 11/2017 | Menheere |
| 2018/0025884 | A1 | 1/2018 | Flitsch |
| 2018/0057150 | A1* | 3/2018 | Cheung ............... B64C 21/06 |
| 2018/0163558 | A1 | 6/2018 | Vondrell et al. |
| 2018/0170556 | A1 | 6/2018 | Goodman et al. |
| 2018/0178920 | A1 | 6/2018 | Swann et al. |
| 2018/0258848 | A1 | 9/2018 | Karam |
| 2018/0297683 | A1 | 10/2018 | Armstrong |
| 2018/0370641 | A1* | 12/2018 | Dindar ................. F01D 15/10 |
| 2019/0085714 | A1* | 3/2019 | Zatorski .............. F01D 15/10 |
| 2019/0322382 | A1 | 10/2019 | Mackin |
| 2019/0323426 | A1 | 10/2019 | Mackin |
| 2019/0323427 | A1 | 10/2019 | Mackin |

FOREIGN PATENT DOCUMENTS

| | | |
|---|---|---|
| DE | 102014224637 | 6/2016 |
| EP | 0493531 | 7/1992 |
| EP | 2122139 | 11/2009 |
| EP | 2924247 | 9/2015 |
| EP | 2964945 | 1/2016 |
| EP | 3118435 | 1/2017 |
| EP | 3335995 | 6/2018 |
| EP | 3421366 | 1/2019 |
| GB | 2558228 | 7/2018 |
| JP | H0791278 | 4/1995 |

OTHER PUBLICATIONS

European Patent Office, "Extended European Search Report", issued in connection with application No. 19166386.3 dated Aug. 19, 2019, 10 pages.
United States Patent and Trademark Office, "Non-Final Office Action", issued in connection with U.S. Appl. No. 15/957,573 dated Mar. 13, 2020, 17 pages.
United States Patent and Trademark Office, "Non-Final Office Action", issued in connection with U.S. Appl. No. 15/957,527 dated Mar. 30, 2020, 18 pages.
Schier et al., "Highly Integrated Electric Drives for Automotive Application", 2015 International Conference on Sustainable Mobility Applications, Renewables and Technology (SMART), 2015, pp. 1-6, 6 pages.
Choi, Benjamin B., "Propulsion Powertrain Simulator: Future Turboelectric Distributed-Propulsion Aircraft", IEEE Electrification Magazine, Dec. 2014, pp. 23-34, 12 pages.
Powell et al., "Dynamic Modeling and Control of Hybrid Electric Vehicle Powertrain Systems", Oct. 1998, IEEE, pp. 17-33, 17 pages.
Shaw et al., "More Electric Power System Concepts for an Environmentally Responsible Aircraft (N+2)", IEEE, 2012, pp. 1-6, 6 pages.
European Patent Office, "Extended European Search Report", issued in connection with application No. 19160347.1 dated Sep. 18, 2019, 5 pages.
European Patent Office, "Extended European Search Report", issued in connection with application No. 19160341.4 dated Oct. 18, 2019, 9 pages.
United States Patent and Trademark Office, "Non-Final Office Action", issued in connection with U.S. Appl. No. 15/957,573 dated Feb. 24, 2021, 8 pages.
United States Patent and Trademark Office, "Notice of Allowance", issued in connection with U.S. Appl. No. 15/957,527 dated Mar. 10, 2021, 9 pages.

\* cited by examiner

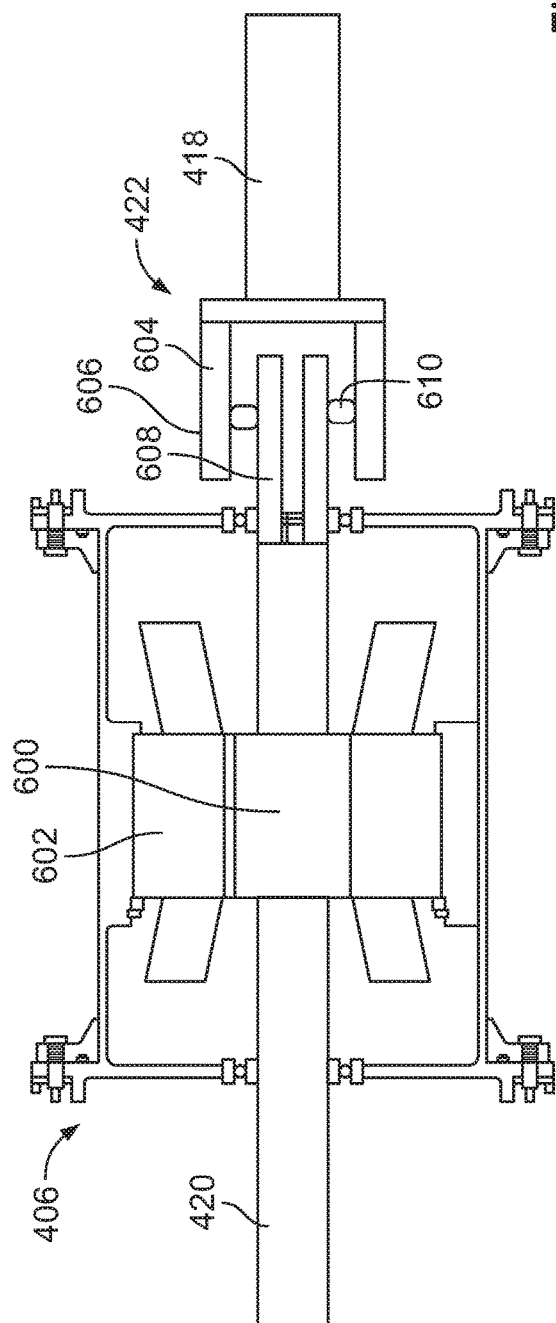
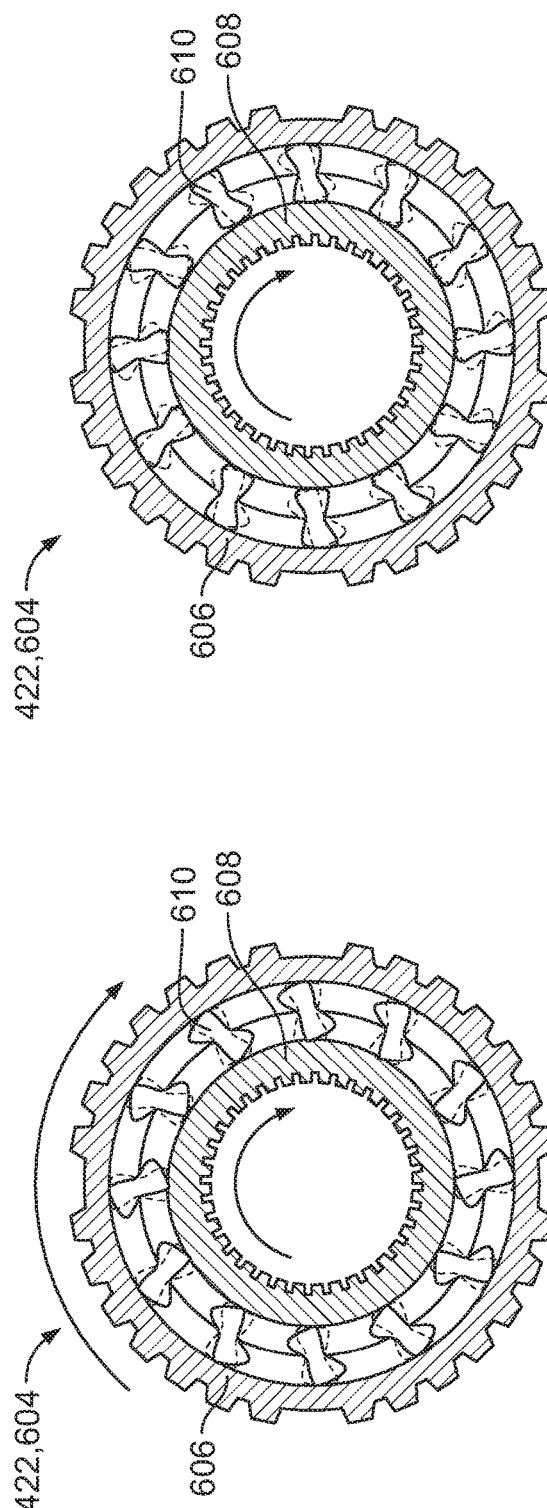

US 10,981,660 B2

HYBRID PROPULSION ENGINES FOR AIRCRAFT

FIELD OF THE DISCLOSURE

This disclosure relates generally to aircraft and, more particularly, to hybrid propulsion engines for aircraft.

BACKGROUND

Aircraft typically include one or more engines to produce thrust. There are many different types or arrangements of engines, such as turbofan engines, turboprop engines, etc. These engines include a propulsor, such as a fan or propeller, for producing thrust and an engine core, such as a gas turbine engine, that drives the propulsor. While effective for certain flight conditions, these engines are typically limited in the altitude at which they can operate. Also, for longer distance flights, larger engines are needed, which are typically heavy and, thus, decrease the efficiency of the aircraft. Further, longer flights require more fuel, which further adds weight to the aircraft.

SUMMARY

Disclosed herein is a hybrid propulsion engine for an aircraft. The hybrid propulsion engine includes a propulsor and a gas turbine engine to drive the propulsor during a first mode of operation. The gas turbine engine has a core air intake. The hybrid propulsion engine also includes an electric motor to drive the propulsor during a second mode of operation and a damper disposed in the core air intake of the gas turbine engine to block airflow through the core air intake during the second mode of operation.

A method disclosed herein includes receiving, at a controller, an input signal requesting to change a state of a damper from an open state to a closed state. The damper is disposed in a core air intake of a gas turbine engine of a hybrid propulsion engine. The hybrid propulsion engine is to use the gas turbine engine to drive a propulsor during a first mode of operation and use an electric motor to drive the propulsor during a second mode of operation. The method further includes determining, via the controller, whether one or more state-change parameters are satisfied and, while the hybrid propulsion engine is operating in the second mode of operation, sending, via the controller, a command signal to move the damper from the open state to the closed state based on the determination that the one or more state-change parameters are satisfied.

An aircraft disclosed herein includes a hybrid propulsion engine including a propulsor and a gas turbine engine operatively coupled to the propulsor. The gas turbine engine having a compressor and a core air intake to direct air into the compressor. The hybrid propulsion engine also includes a damper disposed in the core air intake. The damper is operable between an open state to allow airflow into the compressor and a closed state to block airflow into the compressor.

BRIEF DESCRIPTION OF THE DRAWINGS

FIG. 6 is an enlarged view of the electric motor of the hybrid propulsion engine of FIG. 4.

FIGS. 7A and 7B are cross-sectional views of an overrunning clutch from FIG. 6.

In FIG. 9, the example core damper is implemented in connection with the example hybrid propulsion engine of FIG. 4.

Figure 1:
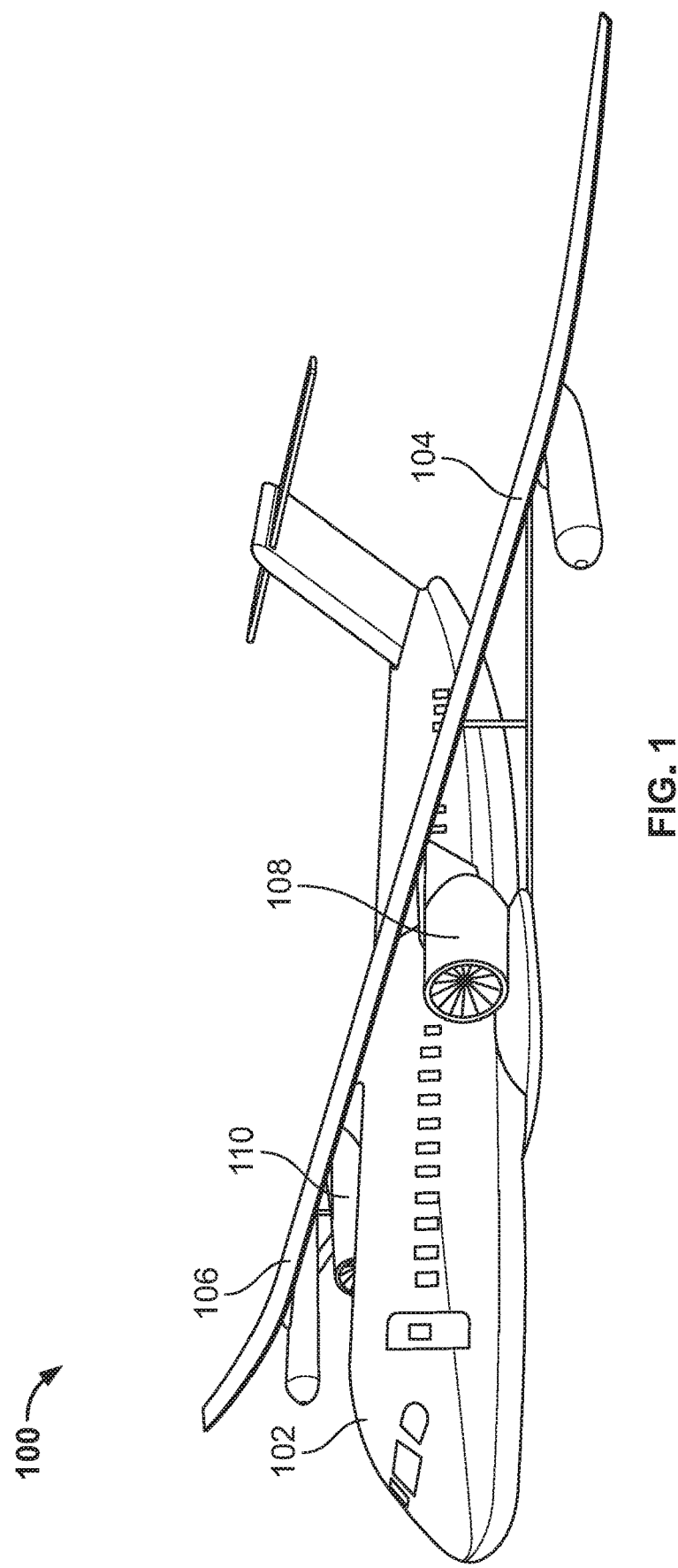
FIG. 1 illustrates an aircraft in which the examples disclosed herein can be implemented.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example hybrid propulsion engines for aircraft. The hybrid propulsion engines include an internal combustion engine, such as a gas turbine engine, and an electric motor that are coupled to a propulsor such as a fan or a propeller and operate in parallel manner to drive the propulsor. The hybrid propulsion engines described herein can operate between different modes of operation in which the gas turbine engine and/or the electric motor are used to drive the propulsor to produce forward thrust. For example, in a first mode of operation, the gas turbine engine drives the propulsor to produce forward thrust when an increased level of thrust is desired. In the first mode of operation, the electric motor can be off and/or otherwise not powering the propulsor. In a second mode of operation, the electric motor drives the propulsor to produce forward thrust (while the gas turbine engine is off and/or otherwise not powering the propulsor), as electric motors are more efficient at driving the propulsor during certain flight conditions. For example, the gas turbine engine can be used during take-off and landing when an increased level of thrust is required. Whereas the electric motor can be used during cruise, where the aircraft is at higher altitudes and subject to less drag. As such, the gas turbine engines are used for less time during the flight. As a result, less fuel is needed onboard the aircraft, thereby further decreasing the overall weight of the aircraft. Further, in some instances the electric motor may be used to supplement the gas turbine engine during take-off and/or climb and, thus, a smaller, lighter gas turbine engine can be utilized.

The example hybrid propulsion engines described herein include a clutch disposed between the gas turbine engine and the electric motor that enables the electric motor to operate independently of the gas turbine engine and without driving or rotating the output shaft of the gas turbine engine. For example, the gas turbine engine includes a first drive shaft (e.g., an output shaft), and the electric motor includes a second drive shaft. The propulsor is coupled to the second drive shaft, and the first drive shaft is coupled to the second drive shaft via a clutch, such as an overrunning clutch. As such, when the gas turbine engine is running during the first mode of operation, the first drive shaft rotates the second drive shaft and, thus, transfers power to the propulsor. During the first mode of operation, the electric motor is off and not affected by the rotating second drive shaft. In the second mode of operation, the electric motor is turned on and used to rotate the second drive shaft, which drives the propulsor and produces forward thrust. During the second mode of operation, the gas turbine engine can be turned off. The overrunning clutch enables the second drive shaft to rotate independent of the first drive shaft and, thus, does not drive or rotate the first drive shaft. In other words, the overrunning clutch enables the gas turbine engine and the electric motor to operate in a parallel manner, rather than in series, such that operation of one does not require operation of the other. In other examples, other types of clutches can be implemented to connect or disconnect the first and second drive shafts.

In some examples, while the gas turbine engine is driving the propulsor in the first mode of operation, the electric motor can be energized and used to overspeed or overdrive the gas turbine engine. This operation can be used to provide temporary bursts of power to the propulsor (e.g., in the event of an engine-out scenario), for example. In other examples, the electric motor can be operated at approximately the same rotational speed as the gas turbine engine to provide torque to the propulsor without overrunning the gas turbine engine. This operation can reduce the load on the gas turbine engine, for example.

Also disclosed herein are core dampers that can be used with aircraft engines. An example core damper disclosed herein can be used with a hybrid propulsion engine to prevent the gas turbine engine from windmilling while the electric motor is driving the propulsor and the gas turbine engine is off. In particular, although the gas turbine engine may be off during the second mode of operation, air flowing through a fan duct may flow into the core air intake and through the gas turbine engine, which can cause the compressor(s) and/or turbine(s) to spin (known as windmilling). However, because the gas turbine engine is off, this windmilling wastes the power in the accelerated air that could otherwise be used to produce thrust. As such, a core damper can be disposed in the core air intake to close off the core air intake and substantially prohibit air from entering the gas turbine engine while the gas turbine engine is not operating. In some examples, the core air intake includes a plurality of vanes. The vanes are movable (e.g., rotatable) from an open position where air flows between the vanes (and/or otherwise through the core air intake) and into the gas turbine engine and a closed position where the vanes block airflow into the gas turbine engine. By blocking the airflow through the core air intake when the gas turbine engine is not operating, less airflow is wasted and, thus, more airflow is used to produce thrust.

In some examples, the damper may be used to regulate an operational temperature of the gas turbine engine. For example, while the hybrid propulsion engine is operating in the second mode of operation (where the electric motor is driving the propulsor the gas turbine engine is off and/or otherwise not driving the propulsor), the damper can be moved from a closed state to a partially open state to enable the gas turbine engine to be turned on and operated at a low speed (e.g., idle). Running the gas turbine engine, even at low speeds, helps the gas turbine engine and other components of the hybrid propulsion engine remain warm, which enables a quicker startup. Further, operating the gas turbine engine at idle causes the oil to circulate, which helps keep the components of the hybrid propulsion engine including the damper warm to prevent ice buildup. The gas turbine engine can be turned on and off periodically to ensure no ice buildup. In other examples, rather than starting and running the gas turbine engine, the damper remains closed, and the starter of the gas turbine engine can be used to periodically drive the spools of the gas turbines engine at a low speed, which circulates the oil to keep the engine warm and, thus, keep the damper warm. Additionally or alternatively, a separate heater (e.g., an electric heating element) may be used to heat the core damper and/or the oil to prevent freezing.

FIG. 1 illustrates an aircraft 100 in which the examples disclosed herein can be implemented. The aircraft 100 includes a fuselage 102, a first wing 104 (a left wing) coupled to the fuselage 102, and a second wing 106 (a right wing) coupled to the fuselage 102. In the illustrated example, the aircraft 100 includes a first propulsion generator 108 and a second propulsion generator 110 carried by the first and second wings 104, 106, respectively. In other examples, the aircraft 100 may include only one propulsion generator or may include more than two propulsion generators. The propulsion generator(s) can be coupled to the first and second wings 104, 106 and/or another structure on the aircraft 100 (e.g., on the tail section of the fuselage 102). The aircraft 100 may be a manned or unmanned aircraft.

Figure 2:
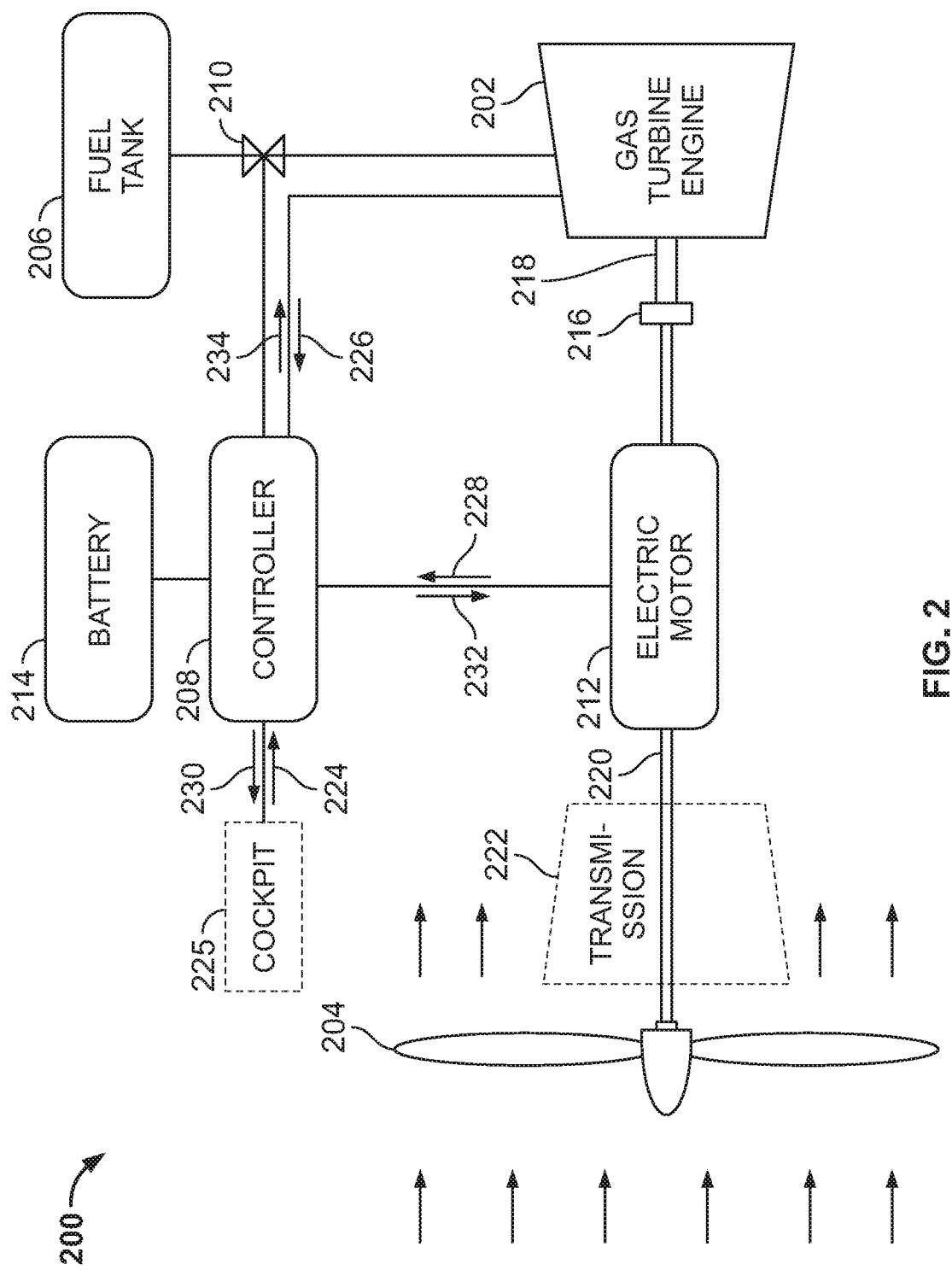
FIG. 2 is a schematic diagram of an example hybrid propulsion engine constructed in accordance with the teachings of this disclosure.

FIG. 2 is a schematic diagram of an example hybrid propulsion engine 200 constructed in accordance with the teachings of this disclosure. The hybrid propulsion engine 200 can be implemented as one or both of the propulsion generators 108, 110 of the aircraft 100 (FIG. 1). As shown in FIG. 2, the hybrid propulsion engine 200 includes an internal combustion engine 202 and a propulsor 204 that can be driven by the internal combustion engine 202 to produce forward thrust. In this example, the internal combustion engine 202 is implemented as a gas turbine engine 202. The propulsor 204 can be a fan of a turbofan engine, for example, such as in the turbofan engine shown in FIG. 4 and described in further detail herein. In other examples, the propulsor 204 can be a propeller of a turboprop engine, such as in the turboprop engine shown in FIG. 5. The propulsor 204 can be on the front of the hybrid propulsion engine 200 (known as a tractor configuration) or on the rear of the hybrid propulsion engine 200 (known as a pusher configuration). Also, the propulsor 204 can include two or more propulsors, such as two counter-rotating propellers. The gas turbine engine 202 is powered by fuel from a fuel tank 206. A controller 208 (e.g., an electronic engine controller (EEC), a processor, etc.) controls the on/off operations of the gas turbine engine 202. The controller 208 operates a valve 210 that controls the flow of fuel from the fuel tank 206 to the gas turbine engine 202 and may also control the ignition component(s) and/or a starter of the gas turbine engine 202.

The hybrid propulsion engine 200 of FIG. 2 also includes an electric motor 212 that can be used to drive the propulsor 204 in addition to or as an alternative to the gas turbine engine 202. The electric motor 212 is separate from any starter or auxiliary power unit (APU) (e.g., an electric motor, a pneumatic motor, a small gas turbine, etc.) associated with the hybrid propulsion engine 200 for starting purposes. The electric motor 212 is powered by an electrical power source 214 and controlled via the controller 208. In the illustrated embodiment, the power source 214 is a battery 214. The gas turbine engine 202 and the electric motor 212 are coupled to the propulsor 204 in a manner that enables each to drive the propulsor 204 independently of the other. In particular, the hybrid propulsion engine 200 is operable in different modes of operation where the gas turbine engine 202 and/or the electric motor 212 is used to drive the propulsor 204 to produce thrust. For example, the hybrid propulsion engine 200 is operable in a first mode of operation where the gas turbine engine 202 is running and the electric motor 212 is off. In this first mode of operation only the gas turbine engine 202 drives the propulsor 204. In a second mode of operation the electric motor 212 is running and the gas turbine engine 202 is off, such that only the electric motor 212 drives the propulsor 204. Using this arrangement and combination of the gas turbine engine 202 and the electric motor 212 enables the gas turbine engine 202 to be smaller and lighter and, thus, reduces the overall size and weight of the hybrid propulsion engine 200. For example, the gas turbine engine 202 can be used to drive the propulsor 204 during take-off and/or landing where more power and/or control is needed, and the electric motor 212 can be used to drive the propulsor 204 during cruise (which accounts for a majority of the flight time). During cruise, the aircraft 100 is generally at a higher altitude where the atmosphere is thinner and, thus, produces less drag on the aircraft 100. As such, less power is usually needed to drive the propulsor 204 to produce sufficient thrust. The electric motor 212 can be used to drive the propulsor 204 at cruise more efficiently than the gas turbine engine 202. Therefore, the gas turbine engine 202 may be used less during normal flights than conventional gas turbine engines that are used throughout the whole flight. As a result, less fuel is needed onboard the aircraft 100, which reduces the overall weight of the aircraft 100.

To enable the electric motor 212 to drive the propulsor 204 independently of the gas turbine engine 202 (and vice versa), the example hybrid propulsion engine 200 includes a clutch 216. In this example, the clutch 216 is implemented as an overrunning clutch (sometimes referred to as a freewheel, a no-back clutch, or a one-way roller clutch). The overrunning clutch 216 is disposed between the gas turbine engine 202 and the electric motor 212. In the illustrated example, the gas turbine engine 202 includes a first drive shaft 218 (an output shaft) that is driven when the gas turbine engine 202 is running. In some examples, the gas turbine engine 202 is a multi-spool engine and the first drive shaft 218 corresponds to a low pressure compressor (LPC) shaft of the gas turbine engine 202.

The propulsor 204 is coupled, directly or indirectly, to a second drive shaft 220. In some examples, the second drive shaft 220 is formed integrally with the electric motor 212. Specifically, the second drive shaft 220 can also function as the rotor shaft of the electric motor 212. Optionally, the second drive shaft 220 can be coupled directly to an output of the electric motor 212, e.g. the second drive shaft 220 is coupled to an end of the electric motor 212 rotor. The hybrid propulsion engine 200 can include a transmission 222 (sometimes referred to as a gear box) coupled between the second drive shaft 220 and the propulsor 204. The transmission 222 changes the rotational speed between the second drive shaft 220 and the propulsor 204. Thus, the propulsor 204 is driven by rotating the second drive shaft 220.

During a first mode of operation, the gas turbine engine 202 is running and the electric motor 212 is off. The first drive shaft 218 of the gas turbine engine 202 rotates the second drive shaft 220 via the overrunning clutch 216 and, thus, rotates the propulsor 204. Therefore, in the first mode of operation, the gas turbine engine 202 drives the propulsor 204 via the overrunning clutch 216 to produce forward thrust. While the second drive shaft 220 is rotating, the electric motor 212 is off (e.g., no current is being applied to the coils of the electric motor 212). Conversely, during a second mode of operation, the electric motor 212 is running and the gas turbine engine 202 is either off or transitioning to an off-state. The electric motor 212 rotates the second drive shaft 220 and, thus, drives the propulsor 204. Thus, in the second mode of operation, the electric motor 212 is used to drive the propulsor 204 to produce forward thrust.

In the second mode of operation, the overrunning clutch 216 enables the second drive shaft 220 to rotate without rotating the first drive shaft 218. In other words, when the electric motor 212 is driving the second drive shaft 220, the gas turbine engine 202 is off and the first drive shaft 218 is approximately stationary (not rotated).

In one example, during take-off for example, the aircraft 100 can be configured to operate in the first mode of operation, i.e. the gas turbine engine 202 is driving the propulsor 204 and the electric motor 212 is off. After take-off, it may be desirable to transition from the first mode of operation to the second mode of operation wherein the electric motor 212 is driving the propulsor 204. To transition from the first mode to the second mode, the controller 208 transmits a start command to the electric motor 212 and also transmits a separate command to the gas turbine engine 202. The command to the gas turbine engine may be a stop command or a command to reduce an operational speed of the gas turbine engine 202, e.g. a command to operate the gas turbine engine 202 at idle speed.

When transitioning from the first mode of operation to the second mode of operation, the rotational speed of the gas turbine engine 202 decreases and the rotational speed of the electric motor 212 increases. When the rotational speed of the electric motor 212 is greater than the rotational speed of the gas turbine engine 202, i.e. the rotational speed of the second drive shaft 220 is greater than the rotational speed of the first drive shaft 218, the overrunning clutch 216 disengages such that the electric motor 212 is driving the propulsor 204.

Conversely, when transitioning from the second mode of operation to the first mode of operation, the rotational speed of the gas turbine engine 202 increases and the rotational speed of the electric motor 212 decreases. When the rotational speed of the gas turbine engine 202 is greater than the rotational speed of the electric motor 212, i.e. the rotational speed of the second drive shaft 220 is less than the rotational speed of the first drive shaft 218, the overrunning clutch 216 engages such that the gas turbine engine 202 is driving the propulsor 204 via the first and second drive shafts 218, 220.

As such, the overrunning clutch 216 enables the gas turbine engine 202 and the electric motor 212 to operate in a parallel manner, such that the gas turbine engine 202 and the electric motor 212 can operate to drive the propulsor 204 independent of the other. Thus, while the gas turbine engine 202 and the electric motor 212 are shown as mechanically coupled in series to the propulsor 204, the overrunning clutch 216 enables the gas turbine engine 202 and the electric motor 212 to operate in a parallel manner. The controller 208 controls the on/off operations of the gas turbine engine 202 and the electric motor 212 to switch between the first mode of operation and the second mode of operation based on pilot input (e.g., via activation of a button or switch) and/or an auto-pilot program. In other examples, other types of clutches can be used as an alternative to the overrunning clutch 216. Further, while in this example the hybrid propulsion engine 200 utilizes the gas turbine engine 202, in other examples the hybrid propulsion engine 200 can be implemented in connection with other types of internal combustion engines, such as a reciprocating piston engine or a rotary engine (e.g., a Wankel engine).

In FIG. 2, the propulsor 204, the electric motor 212, and the gas turbine engine 202 are all axially aligned. In particular, the rotational axis of the propulsor 204 is coaxial with the first drive shaft 218 and the second drive shaft 220. In other examples, the rotational axis of the first drive shaft 218 and the second drive shaft 220 remain aligned. However, the propulsor 204 can be offset from the rotational axis of the first drive shaft 218 and the second drive shaft 220. For example, the transmission 222 can include a gear and pinion arrangement that separates the rotational axis of the propulsor 204 from the rotational axes of the first and second drive shafts 218, 220.

In some examples, the hybrid propulsion engine 200 can operate in a third mode of operation where the electric motor 212 is used to supplement the gas turbine engine 202 in driving the propulsor 204 for a period of time without powering down the gas turbine engine 202. For instance, the gas turbine engine 202 may be running and driving the propulsor 204 via the first and second drive shafts 218, 220 (e.g., in the first mode of operation). The overrunning clutch 216 is engaged, such that the gas turbine engine 202 is powering the propulsor 204. Then, the electric motor 212 can be energized. The electric motor 212 can be used to drive the second drive shaft 220 faster than the first drive shaft 218 for a period of time to produce additional thrust. For example, during taxi, the electric motor 212 can be used to add bursts of power to the propulsor 204. The overrunning clutch 216 enables the second drive shaft 220 to rotate faster than the first drive shaft 218. Then, when the electric motor 212 is turned off, the second drive shaft 220 slows down until its speed matches the speed of the first drive shaft 218, at which point the overrunning clutch 216 reengages and the gas turbine engine 202 continues to power the propulsor 204. In other examples, the electric motor 212 can be operated to rotate the second drive shaft 220 at substantially the same speed as the gas turbine engine 202, thereby adding torque to the system and reducing some of the load on the gas turbine engine 202. In other words, the gas turbine engine 202 and the electric motor 212 can both drive the propulsor 204.

In an example operation, assume the hybrid propulsion engine 200 is operating in the first mode of operation, where the gas turbine engine 202 is driving the propulsor 204 and the electric motor 212 is de-energized. The gas turbine engine 202 can be used during take-off and climb, for example, where more thrust is desired. Then, the controller 208 receives an input signal 224 requesting to switch modes from the first mode of operation to the second mode of operation. The input signal 224 can be generated by a pilot in a cockpit 225, for example. Additionally or alternatively, the input signal 224 can be generated by an auto-pilot program (e.g., based on a segment of flight). For example, once a certain altitude is reached, the auto-pilot program can request a mode change to switch to using the electric motor 212 instead of the gas turbine engine 202.

In response to the input signal 224, the controller 208 checks one or more mode-change parameters or conditions to verify whether the mode-change can occur. For example, the controller 208 receives status signals 226, 228 from the gas turbine engine 202 and the electric motor 212, respectively, regarding the operating states of the gas turbine engine 202 and the electric motor 212. The status signals 226, 228 can be generated from one or more sensors associated with the gas turbine engine 202 and/or the electric motor 212. The controller 208 can also receive information from various other flight systems. The mode-change parameter(s) can include the operational conditions of the electric motor 212 and the gas turbine engine 202, the temperature of the gas turbine engine 202, the altitude of the aircraft 100, the speed of the aircraft 100, the segment of flight of the aircraft 100 (e.g., whether the aircraft 100 is in take-off, climb, cruise, etc.), the ambient temperature, any/or any other conditions that may be of interest prior to changing the mode of operation.

The controller 208 may compare the mode-change parameter(s) to one or more threshold(s). If the mode-change parameter(s) is/are not satisfied (e.g., the parameter(s) do not meet the threshold(s)), the controller 208 generates an alert signal 230. In some examples, the controller 208 sends the alert signal 230 to the cockpit 225 to be displayed to a pilot or other aircraft personnel. In such an example, the mode-change does not occur, and the hybrid propulsion engine 200 continues to operate in the first mode of operation where the gas turbine engine 202 is driving the propulsor 204.

If the mode-change parameter(s) is/are satisfied (e.g., the parameter(s) do meet the threshold(s)), the controller 208 sends a command signal 232 (e.g., a start command) to start the electric motor 212. The controller 208 can control the flow of electrical power from the battery 214 to the electric motor 212. Once the controller 208 determines the electric motor 212 is operational and driving the propulsor 204 (e.g., based on the status signals 228 from the electric motor 212), the controller 208 sends a command signal 234 (e.g., a shut-down command) to the gas turbine engine 202 to power down. When switching from the second mode of operation to the first mode of operation, the reverse process occurs. Examples of these processes are disclosed in further detail in connection with the flowcharts in FIGS. 8A and 8B.

In some examples, while the gas turbine engine 202 is running and driving the propulsor 204, the electric motor 212 is used as a generator to charge the battery 214. In other words, while the second drive shaft 220 is rotating, the electric motor 212 generates electrical power that can be used to charge the battery 214. The battery 214 can also be recharged when the aircraft 100 is on the ground (e.g., while waiting at an airport terminal). The controller 208 manages the flow of electrical power between the electric motor 212 and the battery 214. The electrical power stored in the battery 214 is used to power the electric motor 212 at a later time and/or used to power one or more other electrical system(s) of the aircraft 100. Additionally or alternatively, the electrical power generated by the electric motor 212 can be provided directly to one or more electrical system(s) of the aircraft 100 (without going through the battery 214). In other examples, instead of using the electric motor 212 as a generator, the controller 208 can disconnect the electric motor 212 from the battery 214, such that no power is generated by the electric motor 212, which reduces torque on the second drive shaft 220 that may otherwise be caused by the electric motor 212 when operating as a generator. While in the illustrated example the battery 214 is used to store electrical power, in other examples, the battery 214 can be implemented as a fuel cell, a capacitor, and/or any other device capable of storing electrical power. Thus, the electric motor 212 can be used to drive the propulsor 204 to produce thrust during flight (e.g., during cruise), can be used when there is a failure in the gas turbine engine 202, can be used supplement the gas turbine engine 202 (e.g., to provide extra power for short periods), and/or can be used to produce electrical power for the aircraft 100.

Figure 3:
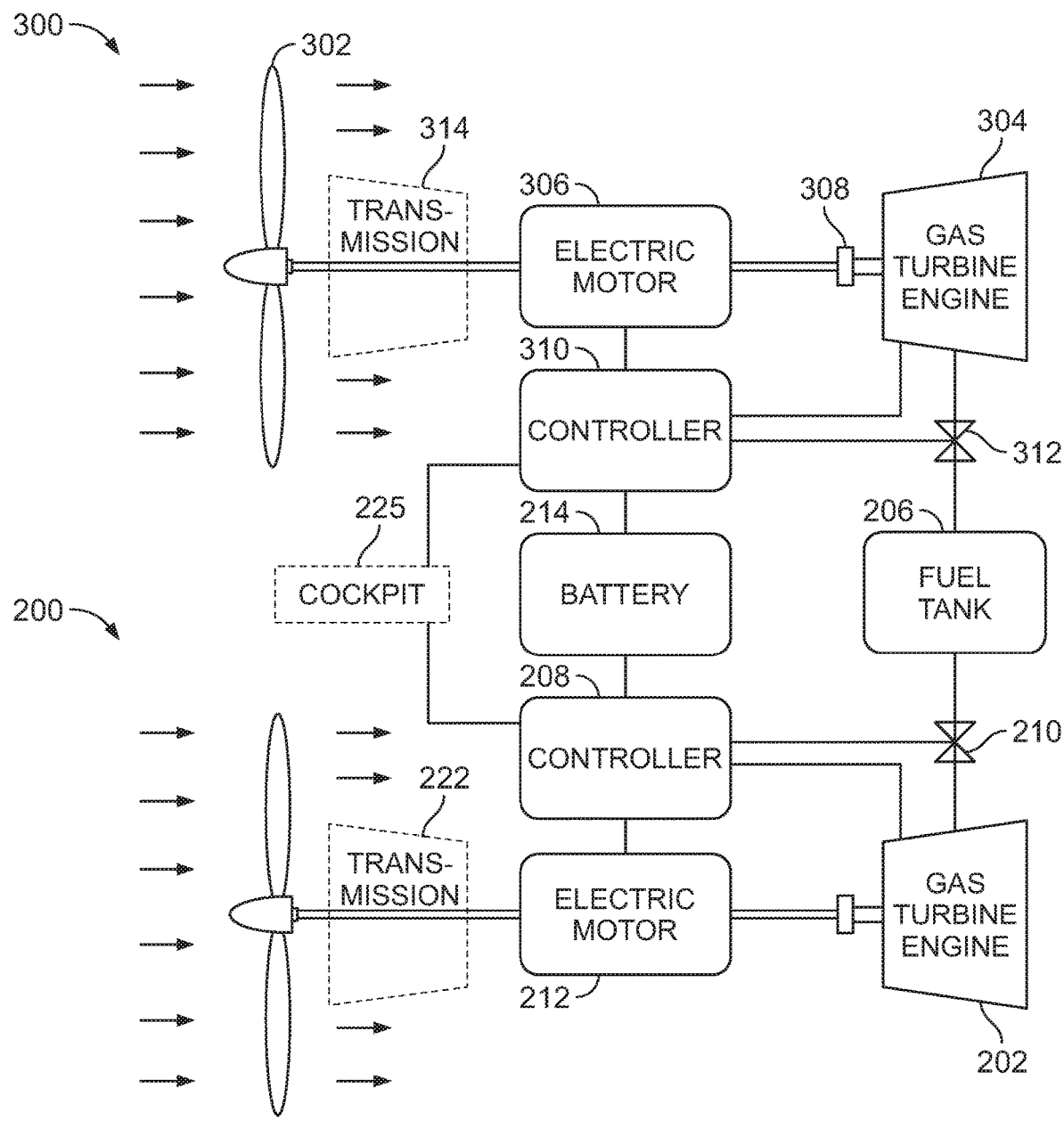
FIG. 3 is a schematic diagram of two example hybrid propulsion engines.

FIG. 3 is a schematic showing two hybrid propulsions engines, including the first hybrid propulsion engine 200 from FIG. 2 and a second hybrid propulsion engine 300. In the illustrated example, the second hybrid propulsion engine 300 is substantially the same as the first hybrid propulsion engine 200. In particular, the second hybrid propulsion engine 300 includes a second propulsor 302, a second gas turbine engine 304, a second electric motor 306, and a second overrunning clutch 308 operatively coupled between the second gas turbine engine 304 and the second electric motor 306 to enable the second electric motor 306 to drive the second propulsor 302 independent of the second gas turbine engine 304. The second hybrid propulsion engine 300 also includes a second controller 310 that controls the on/off operations of the second gas turbine engine 304 (e.g., by controlling a second valve 312) and/or the second electric motor 306. In some examples, the controllers 208, 310 are implemented by the same controller. In some examples, the second hybrid propulsion engine 300 includes a second transmission 314. The second hybrid propulsion engine 300 can operate in substantially the same modes of operation as the hybrid propulsion engine 200. Thus, to avoid redundancy, a description of the operations of the second hybrid propulsion engine 300 is not provided again in connection with FIG. 3. The first and second hybrid propulsion engines 200, 300 may correspond to the first and second propulsion generators 108, 110 (FIG. 1), respectively, of the aircraft 100.

In FIG. 3, the first and second hybrid propulsion engines 200, 300 share the battery 214 and the fuel tank 206. Thus, in some examples, two or more hybrid propulsion engines can utilize the same resources. As mentioned above, the aircraft 100 may include more than two hybrid propulsion engines, all of which can share the same resources. In other examples, the hybrid propulsion engine(s) can utilize their own dedicated resource(s) and/or may be grouped together in other arrangements (e.g., right wing engines share the same resources and left wing engines share the same resources). In still other examples, one of the hybrid propulsion engines 200, 300 can be used to power multiple propulsors on an aircraft. For example, an aircraft can include a plurality of propulsors spaced apart on a wing of the aircraft. The hybrid propulsion engine 200 can be coupled to the propulsors via a transmission, such that the hybrid propulsion engine 200 can be used to power all of the propulsors using the gas turbine engine 202 and/or the electric motor 212.

Figure 4:
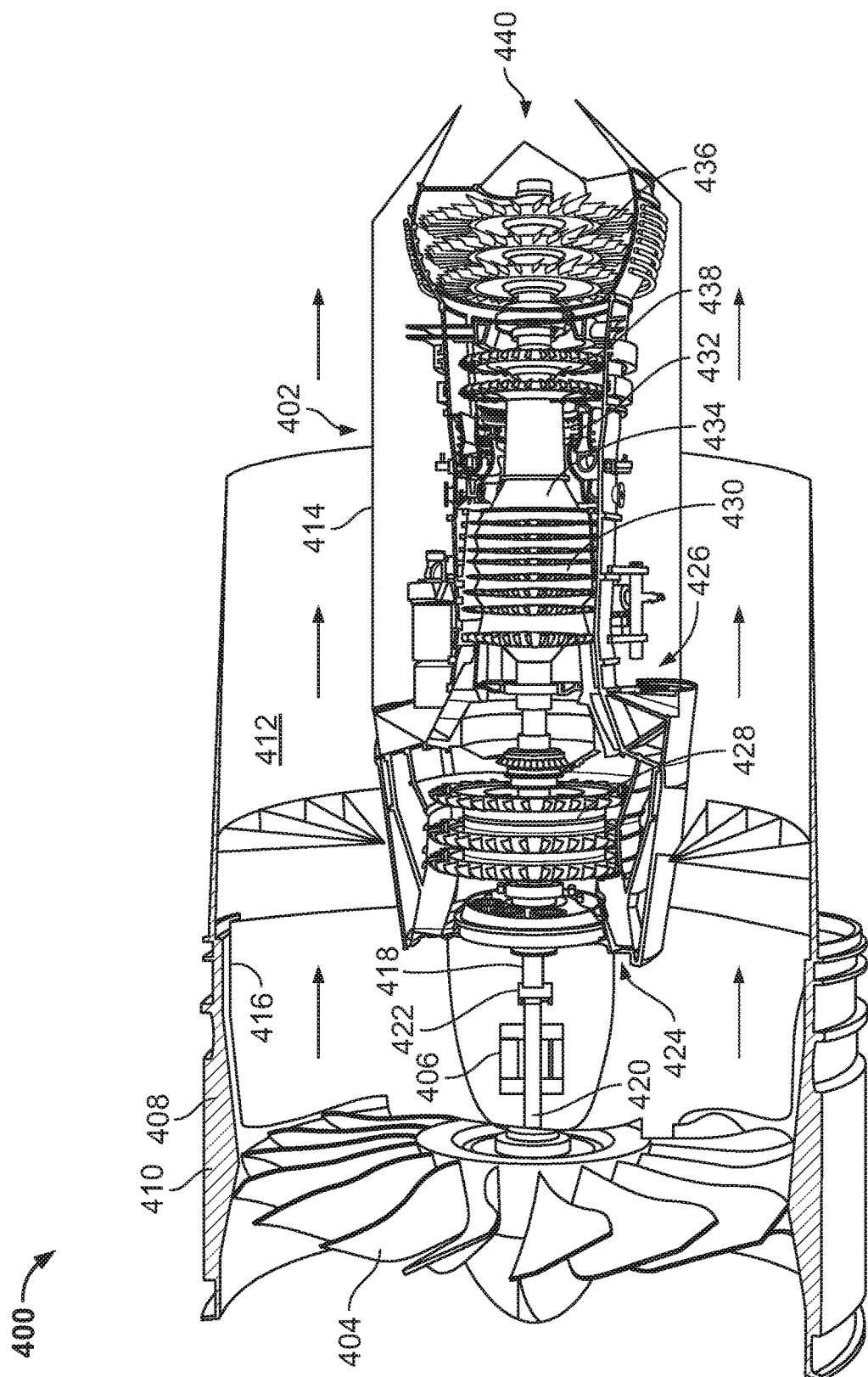
FIG. 4 is a partial cutaway view of an example hybrid propulsion engine implemented in connection with a turbofan engine including a gas turbine engine and electric motor.

FIG. 4 is a partial cutaway view of an example hybrid propulsion engine 400 that can be implemented as the hybrid propulsion engine 200 of FIGS. 2 and 3 and used as one of the propulsion generators 108, 110 on the aircraft 100. In the illustrated example, the hybrid propulsion engine 400 is implemented as a turbofan engine. The hybrid propulsion engine 400 includes a gas turbine engine 402, a fan 404, and an electric motor 406, which correspond to the gas turbine engine 202, the propulsor 204, and the electric motor 212, respectively, of the hybrid propulsion engine 200 of FIG. 2. The gas turbine engine 402 and the electric motor 406 operate in different modes to drive the fan 404 to produce thrust.

In the illustrated example, the hybrid propulsion engine 400 includes a nacelle 408. The gas turbine engine 402 and the electric motor 406 are disposed within (e.g., surrounded by) the nacelle 408. The fan 404 rotates within a fan cowl 410 (e.g., a fan frame) of the nacelle 408. A fan duct 412 (e.g., a bypass, a passageway, a channel, a nozzle duct, etc.) is defined between an outer wall 414 (sometimes referred to as a core cowl) of the gas turbine engine 402 and an inner wall 416 of the nacelle 408. As the fan 404 rotates, the fan 404 produces airflow (as shown by the arrows), at least a portion of which flows through the fan duct 412 (e.g., aft of the fan cowl 410) and produces forward thrust.

As shown in FIG. 4, the gas turbine engine 402 includes a first drive shaft 418. The fan 404 is coupled (directly or indirectly) to and driven by a second drive shaft 420. The second drive shaft 420 is the output shaft (e.g., the rotor) of the electric motor 406. The first and second drive shafts 418, 420 are coupled via an overrunning clutch 422. The first drive shaft 418, the second drive shaft 420, and the overrunning clutch 422 may correspond to the first drive shaft 218, the second drive shaft 220, and the overrunning clutch 216, respectively, of the example hybrid propulsion engine 200 of FIG. 2 and operate in substantially the same manner.

The gas turbine engine 402 operates by drawing air through a core air intake 424 (at a fore end of the gas turbine engine 402) and into a compressor 426. In particular, when the gas turbine engine 402 is running, a portion of the airflow from the fan duct 412 is diverted through the core air intake 424 and into the compressor 426 of the gas turbine engine 402. The compressor 426 can include multiple compressor sections. For example, the compressor 426 of FIG. 4 is a dual-axial compressor that includes two compressors, a first compressor 428 and a second compressor 430. Each of the first and second compressors 428, 430 includes various compressor stages that progressively increase the pressure of the air as the air flows from the core air intake 424 to a combustion chamber 432. The first compressor 428 is a low-pressure compressor (LPC) that provides relatively low pressure air and the second compressor 430 is a high-pressure compressor (HPC) that provides relatively high pressure air. The first compressor 428 is coupled to the first drive shaft 418, and the second compressor 430 is coupled to a third drive shaft 434 (e.g., a second drive shaft of the gas turbine engine 402). The first drive shaft 418 (e.g., the LPC shaft) is coupled to and driven by a first turbine 436 (e.g., a low-pressure turbine) and the third drive shaft 434 (e.g., a HPC shaft) is coupled to and driven a second turbine 438 (e.g., a high-pressure turbine). In this example, the compressor 426 is a dual-axial compressor that includes the two compressors 428, 430. However, in other examples, the compressor 426 can include more or fewer compressor sections, each coupled to a turbine via a respective shaft.

After exiting the second compressor 430 (the HPC), the highly pressurized air is provided to the combustion chamber 432, where fuel (e.g., from the fuel tank 206 of FIG. 2) is injected and mixed with the highly pressurized air and ignited. The high energy airflow exiting the combustion chamber 432 turns the blades of the first and second turbines 436, 438, which are coupled to respective ones of the first and third drive shafts 418, 434. The first drive shaft 418 extends through and rotates independently of the third drive shaft 434. As such, rotation of the first and third drive shafts 418, 434 turns the blades of the first and second compressors 428, 430, respectively. The heated air is exhausted via a nozzle 440, aftward, where it mixes with the accelerated airflow provided by the fan 404 in the fan duct 412 to produce forward thrust that propels the aircraft 100 in a forward direction.

In this example, the rotational axis of the fan 404 is coaxial with the first drive shaft 418 and the second drive shaft 420. In other words, the fan 404, the first drive shaft 418, and the second drive shaft 420 are axially aligned. In other examples, the rotational axis of the fan 404 is parallel to and offset from the first and second drive shafts 418, 420.

In a first mode of operation, the gas turbine engine 402 is running and the electric motor 406 is off. The gas turbine engine 402 produces rotation in the first drive shaft 418, which rotates the second drive shaft 420 via the overrunning clutch 422 and, thus, rotates the fan 404. In a second mode of operation, the electric motor 406 is running and the gas turbine engine 402 is off. The electric motor 406 operates to rotate the second drive shaft 420, thereby rotating the fan 404. The overrunning clutch 422 enables the second drive shaft 420 to rotate independently of the first drive shaft 418. In some examples, a transmission is disposed between the second drive shaft 420 and the fan 404 to change the rotational speed between the second drive shaft 420 and the fan 404.

Turning briefly to FIGS. 6, 7A, and 7B, FIG. 6 shows an enlarged view of the electric motor 406, the first drive shaft 418, the second drive shaft 420, and the overrunning clutch 422. In the illustrated example, the electric motor 406 includes an armature 600 coupled to the second drive shaft 420 and a stator 602 surrounding the armature 600. The armature 600 may be formed unitarily with the second drive shaft 420. The armature 600 may include coils and the stator 602 may include magnets (or electromagnets), or vice versa. When the electric motor 406 is energized (e.g., via the controller 208 of FIG. 2), the armature 600 rotates, thereby rotating the second drive shaft 420. When the electric motor 406 is de-energized the armature 600 no longer functions as the primary driver of the fan 404. However, the armature 600 and therefore, the second drive shaft 420 are still free to rotate within the stator 602. In some examples, the electric motor 406 operates as a generator to charge a battery (e.g., the battery 214 of FIG. 2) and/or provide electrical power directly to one or more electrical system(s) of the aircraft 100. The electric motor 406 can be implemented as any type of electric motor (e.g., an induction motor, a DC/AC permanent magnet motor, etc.) and is not limited to the example electric motor 406 shown in FIG. 6. Instead, it is understood that other types of electric motors can be similarly used, and the armature, stator, commutator, etc. may be arranged differently depending on the type of motor.

In the illustrated example, the overrunning clutch 422 is implemented as a sprag clutch 604. The sprag clutch 604 includes an outer race 606, an inner race 608, and a plurality of movable sprags 610 disposed between the outer race 606 and the inner race 608. In this example, the first drive shaft 418 (which is powered by the gas turbine engine 402 (FIG. 4)) is coupled to the outer race 606 and the second drive shaft 420 (which is coupled to the fan 404 (FIG. 4)) is coupled to the inner race 608. FIGS. 7A and 7B are cross-sectional views of the example overrunning clutch 422. The sprags 610 (one of which is referenced in each figure) are pivotable about their centers (extending into the page). In FIG. 7A, the outer race 606 is rotating in the clockwise direction. This occurs, for example, during the first mode of operation when the gas turbine engine 402 is on and the electric motor 406 is off. The interaction between the outer race 606 and the sprags 610 causes the sprags 610 to pivot into and engage the inner race 608. As a result, the outer race 606, the sprags 610, and the inner race 608 all rotate together, in the clockwise direction. Therefore, when the first drive shaft 418 rotates the outer race 606, the outer race 606 rotates the inner race 608 and, thus, rotates the second drive shaft 420 in the same direction. In FIG. 7B, the inner race 608 is rotating in the clockwise direction independent of the outer race 606. This occurs, for example, during the second mode of operation when the gas turbine engine 402 is off and the electric motor 406 is instead driving the second drive shaft 420. As shown in FIG. 7B, the inner race 608 slides along the inner surfaces of the sprags 610. However, this interaction does not cause the sprags 610 to frictionally engage the outer race 606. As such, the inner race 608 rotates in the clockwise direction without causing rotation of the outer race 606. If the outer race 606 is rotated up to match the rotational speed of the inner race 608, the sprags 610 are rotated into the inner race 608 and the outer race 606 eventually overdrives the inner race 608. As such, the inner race 608 rotates at least as fast as the outer race 606. Conversely, while the outer race 606 is rotating, the inner race 608 can be rotated independently at a faster rotational speed, which does not affect the outer race 606. The overrunning clutch 422 advantageously enables the gas turbine engine 402 and the electric motor 406 to independently drive the propulsor 204 without additional actuating components that are found in other types of clutches. Thus, no power is needed to operate the clutch.

While in this example the first drive shaft 418 is coupled to the outer race 606 and the second drive shaft 420 is coupled to the inner race 608, in other examples, the first and second drive shafts 418, 420 may be coupled to other of the outer and inner races 606, 608 and the direction of rotation may be switched, which results in the same effect. Also, while in this example the overrunning clutch 422 is implemented as the sprag clutch 604, in other examples, the overrunning clutch 422 can be implemented by another type of overrunning clutch, such as a roller ramp clutch, a wrap spring clutch, or a wedge style clutch.

Figure 5:
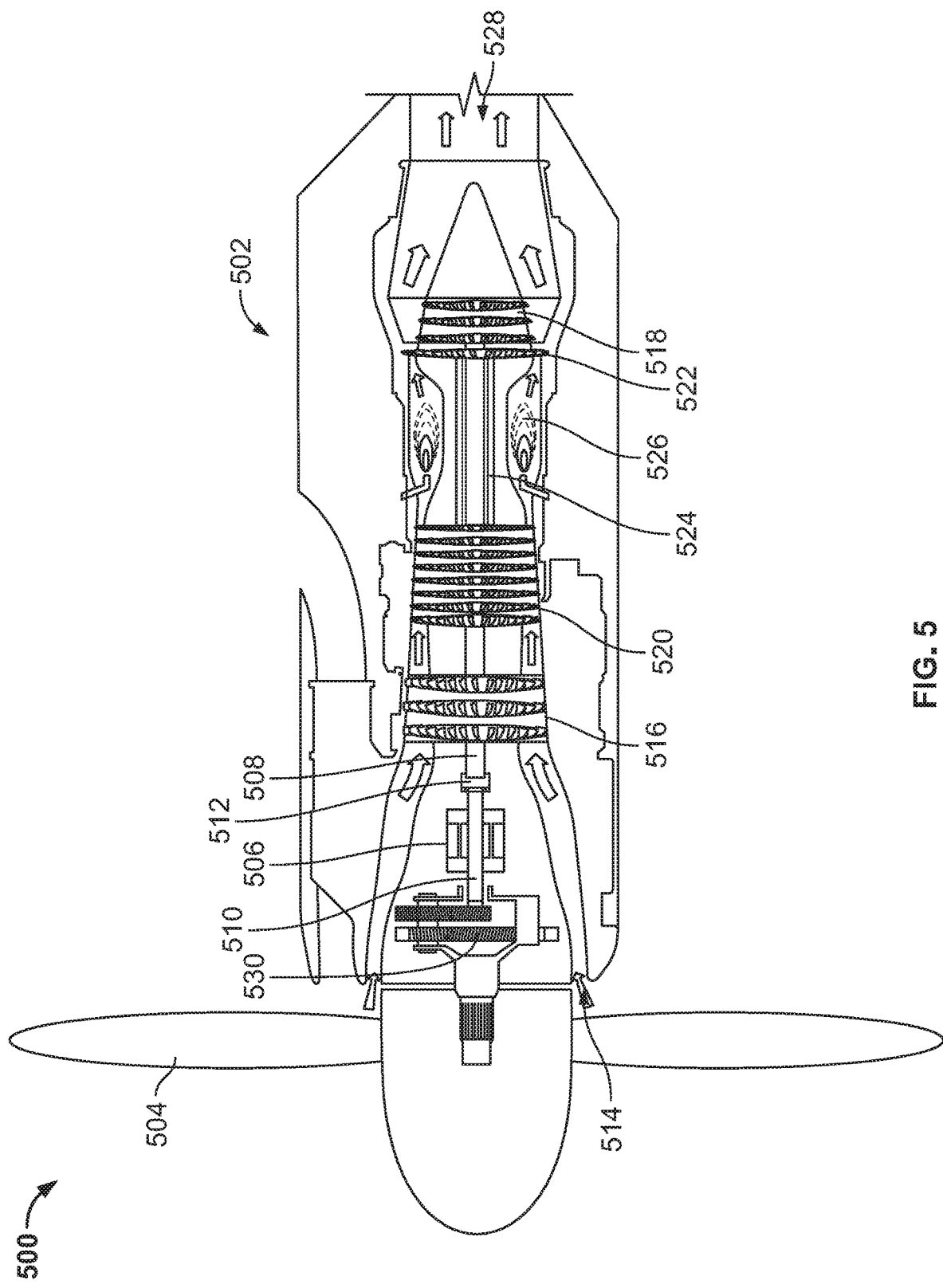
FIG. 5 is a partial cutaway view of an example hybrid propulsion engine implemented in connection with a turboprop engine including a gas turbine engine and electric motor.

Now referring to FIG. 5, FIG. 5 shows a partial cutaway view of another hybrid propulsion engine 500 that can be implemented as the hybrid propulsion engine 200 of FIGS. 2 and 3 and used as one of the propulsion generators 108, 110 on the aircraft 100. In this example, the hybrid propulsion engine 500 is implemented as a turboprop engine. The hybrid propulsion engine 500 includes a gas turbine engine 502, a propeller 504, and an electric motor 506, which correspond, respectively, to the gas turbine engine 202, the propulsor 204, and the electric motor 212 of the hybrid propulsion engine 200 of FIG. 2. Similar to the hybrid propulsion engine 400 of FIG. 4, the gas turbine engine 502 includes a first drive shaft 508, the propeller 504 is coupled (directly or indirectly) to and driven by a second drive shaft 510, the electric motor 506 includes the second drive shaft 510, and the first and second drive shafts 508, 510 are coupled via an overrunning clutch 512. Similar to the examples disclosed above, the gas turbine engine 502 and the electric motor 506 operate in different modes to drive the propeller 504 to produce thrust. Thus, to avoid redundancy, a description of the mode operations is not provided again in connection with FIG. 5. Instead, the interested reader is referred back to description above in connection with FIGS. 2-4 for a full written description of the operations.

Unlike the turbofan engine of FIG. 4, the turboprop engine of FIG. 5 does not include a nacelle or cowl around the propeller 504. Instead, the propeller 504 is an open-air propulsor. Turboprop engines are typically used for lower altitudes and shorter flights compared to turbofan engines. The gas turbine engine 502 of FIG. 5 is substantially similar to the gas turbine engine 402 of FIG. 4 and includes a core air intake 514, a first compressor 516 (a LPC) coupled to a first turbine 518 (a LPT) via the first drive shaft 508, a second compressor 520 (an HPC) coupled to a second turbine 522 (an HPT) via a third drive shaft 524, a combustion chamber 526, and a nozzle 528. In other examples, the gas turbine engine 502 can be arranged differently and/or have more or fewer compressor/turbine sections. Further, the hybrid propulsion engine 500 of FIG. 5 is arranged as a tractor configuration with the propeller 504 on the front of the hybrid propulsion engine 500. However, in other examples, the hybrid propulsion engine 500 can be arranged as a pusher configuration with the propeller 504 in the rear.

As shown in FIG. 5, the hybrid propulsion engine 500 includes a transmission 530 (e.g., a planetary gear system) that couples the second drive shaft 510 to the propeller 504. The transmission 530 is arranged such that the rotational axis of the propeller 504 is coaxial with the first drive shaft 508 and the second drive shaft 510. In other words, the propeller 504, the first drive shaft 508, and the second drive shaft 510 are axially aligned. In other examples, the rotational axis of the propeller 504 is parallel to and offset from the first and second drive shafts 508, 510. For instance, some turboprop engines utilize a transmission that offsets the propeller from the longitudinal axis of the associated turbine gas engine. In other examples, no transmission is included and the second drive shaft 510 is coupled directly to the propeller 504.

Figure 8A:
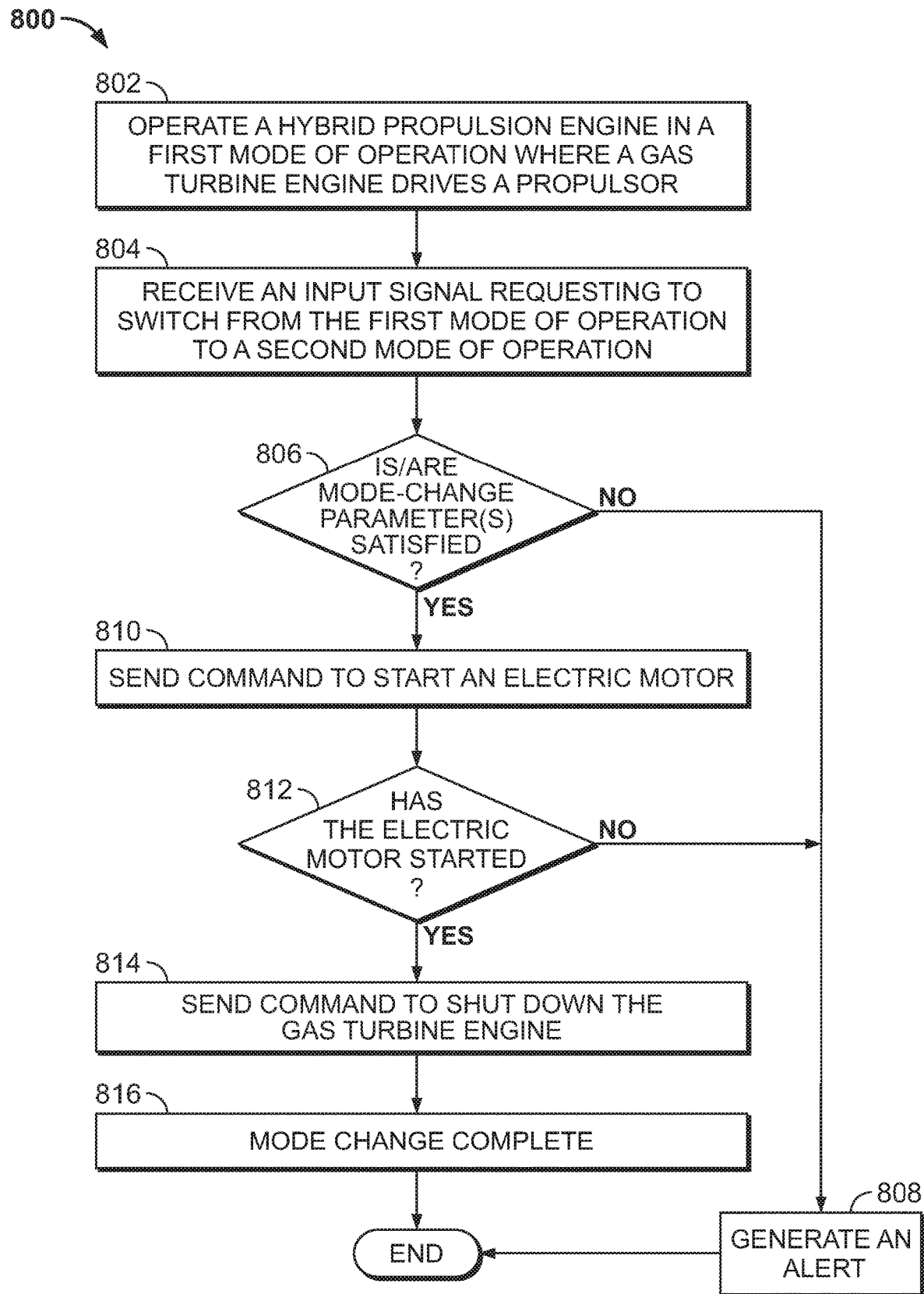
FIG. 8A is a flowchart representative of an example method of changing a hybrid propulsion engine from a first mode of operation to a second mode of operation.

FIG. 8A is a flowchart of an example method 800 of changing an operating-mode of a hybrid propulsion engine from a first mode of operation to a second mode of operation. The method 800 is described in connection with the hybrid propulsion engine 200 of FIG. 2, which can be implemented as a turbofan type of hybrid propulsion engine, such as the hybrid propulsion engine 400 of FIG. 4, or a turboprop type of hybrid propulsion engine, such as the hybrid propulsion engine 500 of FIG. 5. The method 800 is performed at least in part by the controller 208 of FIG. 2, which controls the on/off operations and/or speed control of the gas turbine engine 202 and the electric motor 212.

At block 802, the hybrid propulsion engine 200 is operating in a first mode of operation where the gas turbine engine 202 is driving the propulsor 204. In the first mode of operation, the electric motor 212 is de-energized and/or otherwise not providing power to the propulsor 204. The gas turbine engine 202 drives the first drive shaft 218, which rotates the second drive shaft 220 via the overrunning clutch 216 and, thus, drives the propulsor 204 to produce forward thrust. In some examples, during the first mode of operation, the electric motor 212 operates as a generator to charge the battery 214 and/or provide electrical power directly to one or more system(s) of the aircraft 100.

At block 804, the controller 208 receives the input signal 224 requesting to switch from the first mode of operation to the second mode of operation. The input signal 224 can be generated by a pilot in the cockpit 225, for example. In other examples, the input signal 224 can be generated by an auto-pilot program based on a flight condition. For example, once a certain altitude is reached, the auto-pilot program may request the hybrid propulsion engine 200 to switch modes so the electric motor 212 can be used to more efficiently power the aircraft 100.

At block 806, the controller 208 determines whether one or more mode-change parameter(s) is/are satisfied. The mode-change parameter(s) can include one or more of the operational conditions of the electric motor 212 and the gas turbine engine 202, the temperature of the gas turbine engine 202, the altitude of the aircraft 100, the speed of the aircraft 100, the segment of flight of the aircraft 100 (e.g., whether the aircraft 100 is in cruise or climb), the ambient temperature, etc. The mode-change parameter(s) can be based on information received via the status signals 226, 228 from the gas turbine engine 202 and the electric motor 212.

If the mode-change parameter(s) is/are not satisfied (determined at block 806), the controller 208 generates the alert signal 230 at block 808, and the example method 800 ends. The alert signal 230 can be sent back to the cockpit 225, for example, and displayed to the pilot or another aircraft personnel. In this event, the hybrid propulsion engine 200 does not change modes of operation. For example, if the controller 208 determines the mode-change should not occur because the aircraft 100 is still climbing, the controller generates an alert (block 808) and continues to operate the hybrid propulsion engine 200 in the first mode of operation.

If the mode-change parameter(s) is/are satisfied (determined at block 806), the controller 208 sends the command signal 232 (e.g., a first command signal) to start and/or otherwise energize the electric motor 212 at block 810. For example, if a certain altitude is reached, the controller 208 may determine the mode-change parameter(s) is/are satisfied. The controller 208 can supply power to the electric motor 212 from the battery 214. The electric motor 212 begins driving the second drive shaft 220.

At block 812, the controller 208 verifies that the electric motor 212 has started and is driving the propulsor 204, which may be based on the status signals 228 from the electric motor 212. If the electric motor 212 has not started or is otherwise not operating correctly, the controller 208 generates the alert signal 230, which may be displayed to the pilot, and the example method 800 ends.

If the controller 208 determines the electric motor 212 has started and is powering the propulsor 204, the controller 208, at block 814, sends the command signal 234 (e.g., a second command signal) to the gas turbine engine 202 to shut down and/or otherwise reduce power. The command signal 234 may shut off ignition and/or stop fuel supply (e.g., via the valve 210 of FIG. 2) to the gas turbine engine 402. Thus, the controller 208 ensures the electric motor 212 is powered up prior to shutting down the gas turbine engine 202 to ensure no lapse in power occurs. This transition period can occur over a period of time, such as 30 seconds. Once the electric motor 212 is driving the propulsor 204 and the gas turbine engine 202 is shut down and/or otherwise not providing power to the propulsor 204, the hybrid propulsion engine 200 is operating in the second mode of operation and the mode change is complete (block 816). The example method 800 may then end or proceed to FIG. 8B, which is an example method of switching back to the first mode of operation.

Figure 8B:
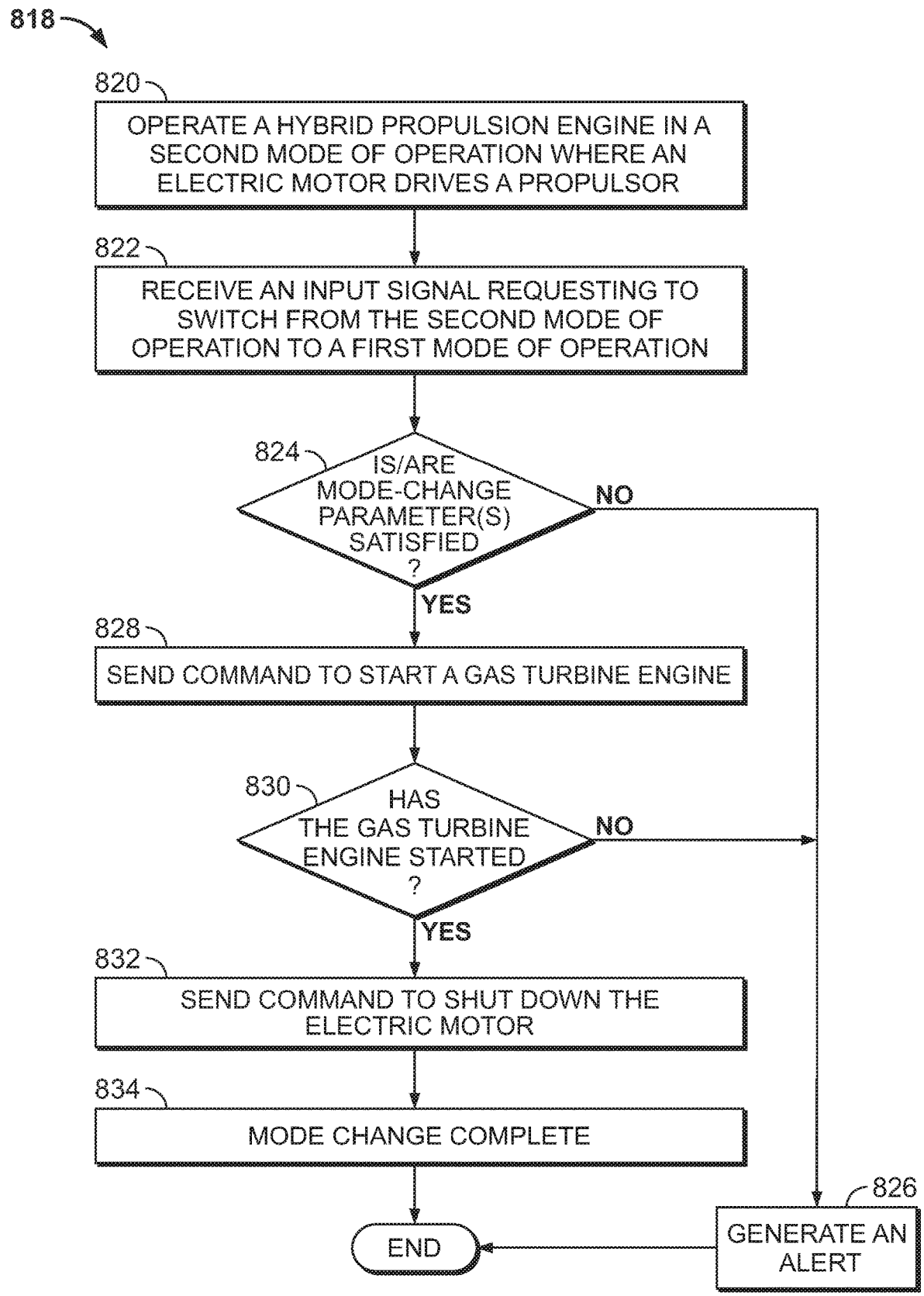
FIG. 8B is a flowchart representative of an example method of changing a hybrid propulsion engine from the second mode of operation to the first mode of operation.

FIG. 8B is a flowchart of an example method 818 of changing an operating-mode of a hybrid propulsion engine from a second mode of operation to a first mode of operation. The method 818 is described in connection with the hybrid propulsion engine 200 of FIG. 2, which can be implemented as a turbofan type of hybrid propulsion engine, such as the hybrid propulsion engine 400 of FIG. 4, or a turbo-prop type of hybrid propulsion engine, such as the hybrid propulsion engine 500 of FIG. 5, for example. The method 818 is performed at least in part by the controller 208 of FIG. 2, which controls the on/off operations and/or speed control of the related gas turbine engine and electric motor.

At block 820, the hybrid propulsion engine 200 is operating in the second mode of operation where the electric motor 212 is driving the propulsor 204. In the second mode of operation, the gas turbine engine 202 is off and/or otherwise not providing power to the propulsor 204 (e.g., operating at idle). The electric motor 212 drives the propulsor 204 via the second drive shaft 220. The overrunning clutch 216 enables the electric motor 212 to drive the second drive shaft 220 (and, thus, the propulsor 204) independent of the gas turbine engine 202.

At block 822, the controller 208 receives the input signal 224 requesting to switch from the second mode of operation to the first mode of operation. Similar to block 804 above, the input signal 224 can be generated by a pilot in the cockpit 225 and/or an auto-pilot program.

At block 824, the controller 208 determines whether one or more mode-change parameter(s) are satisfied. The mode-change parameter(s) can include one or more of the operational conditions of the electric motor 212 and the gas turbine engine 202, the temperature of the gas turbine engine 202, the altitude of the aircraft 100, the speed of the aircraft 100, the segment of flight of the aircraft 100 (e.g., whether the aircraft 100 is in cruise or climb), the ambient temperature, etc.

If the mode-change parameter(s) is/are not satisfied (determined at block 824), the controller 208 generates the alert signal 230 at block 826, and the example method 818 ends. The alert signal 230 can be sent back to the cockpit 225, for example, and displayed to the pilot or another aircraft personnel. In this event, the hybrid propulsion engine 200 does not change modes of operation.

If the mode-change parameter(s) is/are satisfied (determined at block 824), the controller 208 sends the command signal 234 (e.g., a third command signal) to start and/or otherwise power-up the gas turbine engine 202 at block 828. Once the first drive shaft 218 is rotating faster than the second drive shaft 220, the overrunning clutch 216 engages such that the first drive shaft 218 is powering the second drive shaft 220 and, thus, powering the propulsor 204.

At block 830, the controller 208 verifies that the gas turbine engine 212 has started and is driving the propulsor 204, which may be based on the status signals 226 from the gas turbine engine 202. If the gas turbine engine 202 has not started or is otherwise not operating correctly, the controller 208 generates the alert signal 230, which may be displayed to the pilot, and the example method 818 ends.

If the controller 208 determines the gas turbine engine 202 has started and is powering the propulsor 204, the controller 208, at block 832, sends the command signal 232 (e.g., a fourth command signal) to the electric motor 212 to shut down and/or otherwise reduce power. The controller 208 may cut-off electric power from the battery 214, for example. Once the gas turbine engine 202 is driving the propulsor 204 and the electric motor 212 is de-energized and/or otherwise not providing power to the propulsor 204, the hybrid propulsion engine 200 is operating in the first mode of operation and the mode change is complete (block 834). The example method 818 may then end or proceed to FIG. 8A, which is an example method of switching back to the second mode of operation.

The example methods 800, 818 can be repeated any number of times to switch between using the gas turbine engine 202 and the electric motor 212. The hybrid propulsion engine 200 can operate between the first mode of operation and the second mode of operation during different flight segments or conditions. For example, the gas turbine engine 202 can be used to drive the propulsor 204 in the first mode of operation during a first segment of flight, such as take-off and/or landing, and the electric motor 212 can be used to drive the propulsor 204 in the second mode of operation during a second segment of flight, such as cruise. As such, the gas turbine engine 202 is used when more power is typically needed, and then the electric motor 212 is used where less power is needed to improve efficiency. The gas turbine engine 202 and the electric motor 212 can be used in other segments of flight as desired.

Figure 9:
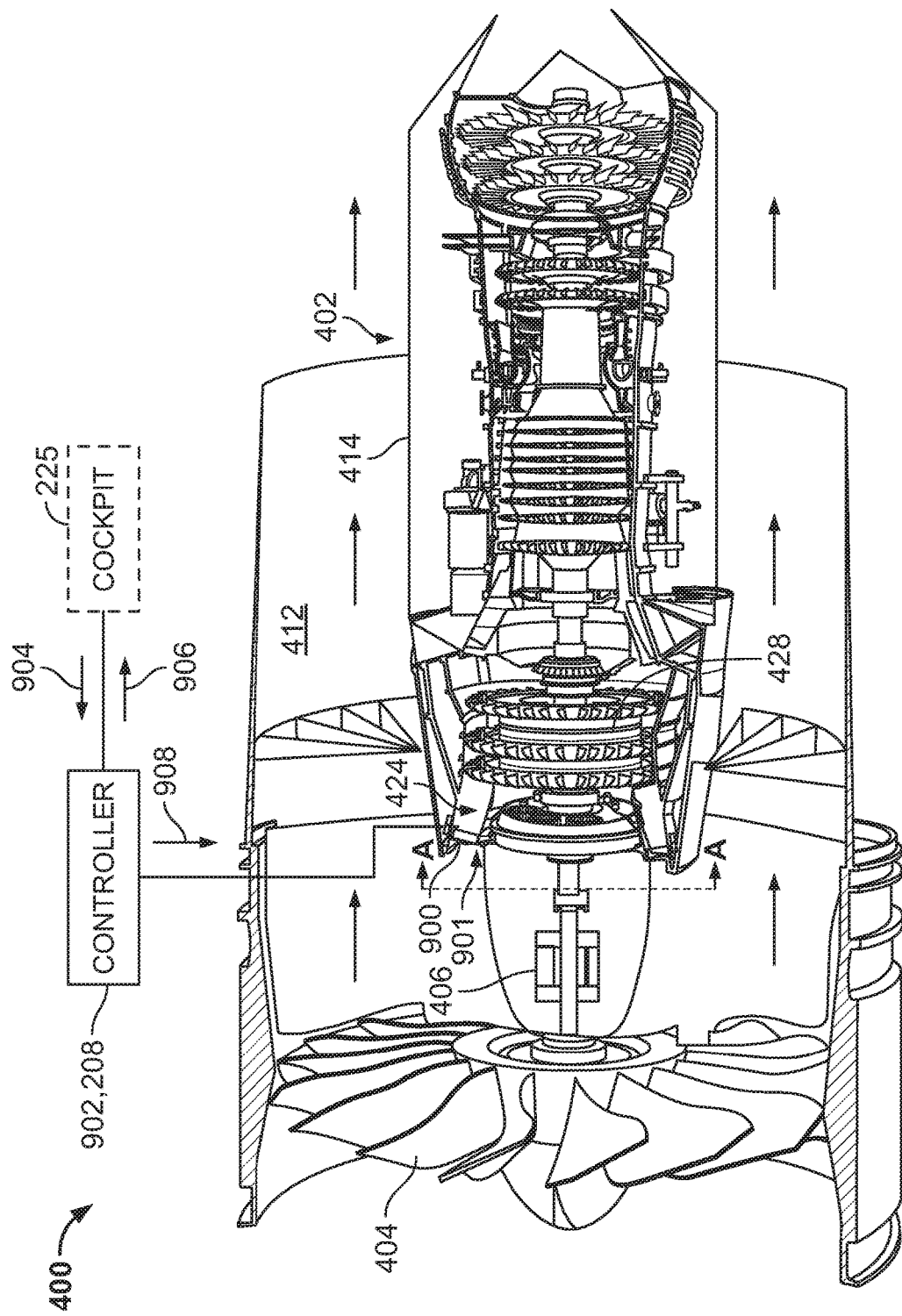
FIG. 9 illustrates an example core damper constructed in accordance with the teachings of this disclosure.

FIG. 9 illustrates an example of the hybrid propulsion engine 400 having a core damper 900 (referred to herein as the damper 900). The damper 900 is used to block airflow into the gas turbine engine 402 when the gas turbine engine 402 is not being used to drive the fan 404. For instance, when hybrid propulsion engine 400 is operating in the second mode of operation, where the gas turbine engine 402 is off (and/or otherwise not driving the fan 404) and the electric motor 406 is driving the fan 404, the airflow in the fan duct 412 can flow through the core air intake 424 and into the first compressor 428, which can cause the first compressor 428 (and/or other sections of the gas turbine engine 402) to windmill. This effect reduces the efficiency of the hybrid propulsion engine 400 by wasting the accelerated airflow in the fan duct 412 that could otherwise be used to produce forward thrust.

Therefore, in the example shown in FIG. 9, the hybrid propulsion engine 400 includes the damper 900. The damper 900 is disposed within the core air intake 424. The core air intake 424 is a passageway or channel between an opening 901 in the outer wall 414 of the gas turbine engine 402 and the first compressor 428. The damper 900 operates between an open state and a closed state. If the gas turbine engine 402 includes inlet guide vanes, the damper 900 is preferably disposed upstream of the inlet guide vanes (which do not close). In the open state, the damper 900 allows airflow through the core air intake 424 and into the first compressor 428. Thus, while the gas turbine engine 402 is running, the damper 900 is in the open state, which allows airflow into the gas turbine engine 402. In the closed state, the damper 900 blocks airflow through the core air intake 424 and into the gas turbine engine 402. As such, the damper 900 isolates the gas turbine engine 402 and prevents the first compressor 428 (and/or other compressor/turbine section(s) of the gas turbine engine 402) from windmilling. The hybrid propulsion engine 400 includes a controller 902 (e.g., a processor) for controlling the core damper 900. If the damper 900 is implemented in connection with the hybrid propulsion engine 400 (corresponding to the hybrid propulsion engine 200 of FIG. 2), the controller 902 can implemented by the controller 208 (FIG. 2), which also controls the on/off operations and/or speeds of the gas turbine engine 402 and the electric motor 406. In other words, the same controller can be used control the mode change operations of the hybrid propulsion engine as well as the operations of the damper 900. However, in other examples the controllers may be separate and in communication with each other.

Figure 11A:
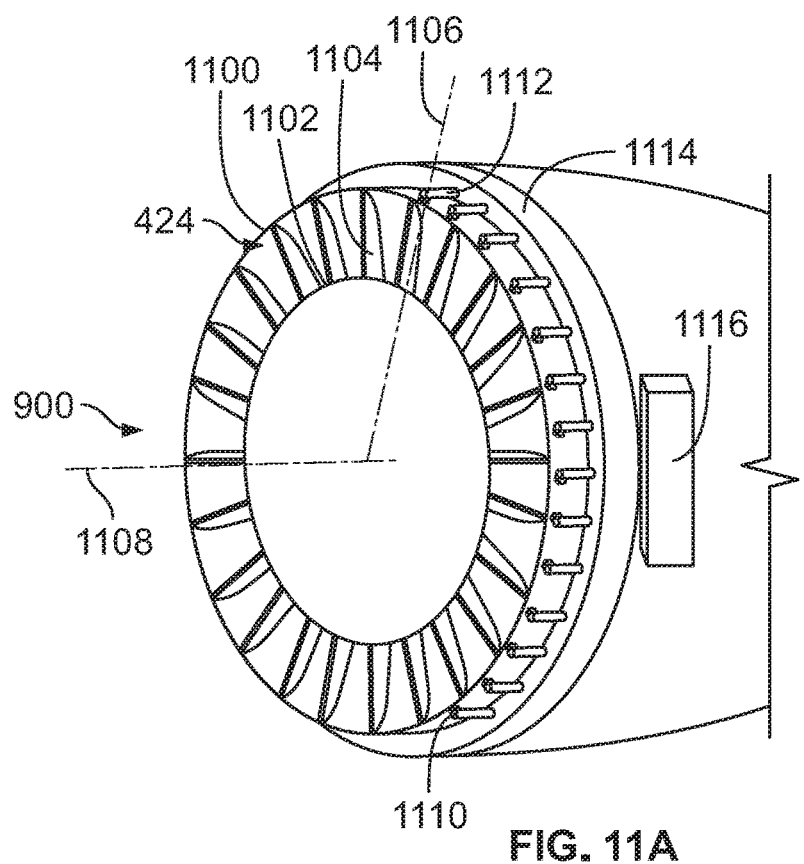
FIGS. 11A and 11B are perspective views of the example core damper of FIG. 9 in an open state and a closed state, respectively.
Figure 11B:
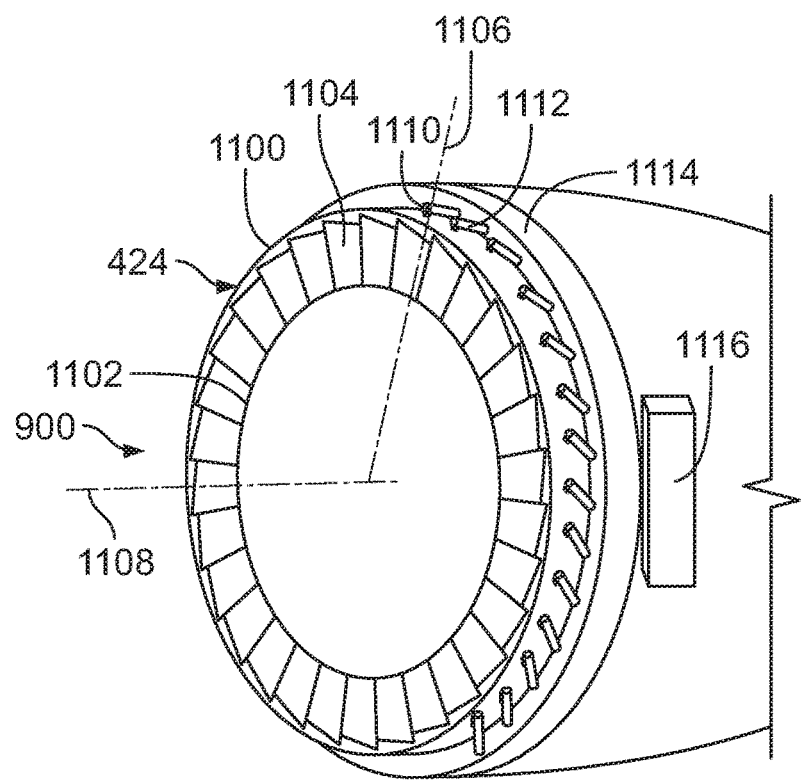

Turning briefly to FIGS. 11A and 11B, FIGS. 11A and 11B are perspective views of the gas turbine engine 402 taken along line A-A from FIG. 9 showing the damper 900 in the core air intake 424. FIG. 11A shows the damper 900 in the open state and FIG. 11B shows the damper 900 in the closed state. The core air intake 424 is defined by an outer radial wall 1100 and an inner radial wall 1102 concentric with the outer radial wall 1100 that form a passageway to direct airflow to the first compressor 428 (FIG. 9). In the illustrated example, the damper 900 includes a plurality of rotatable vanes 1104 (only one of which is referenced in FIGS. 11A and 11B) disposed in the core air intake 424. In particular, the vanes 1104 are radially spaced around the core air intake 424 (e.g., radially substantially equidistant from each other) and extend between the outer radial wall 1100 and the inner radial wall 1102. In this example, the vanes 1104 are rotatable about axes 1106 (one of which is referenced in FIGS. 11A and 11B) that extend radially from a center axis 1108 of the core air intake 424. The vanes 1104 are rotatable between an open position (corresponding to the open state) and a closed position (corresponding to the closed state). In FIG. 11A, the vanes 1104 are in the open position. In the open position, the vanes 1104 are in an orientation that is substantially parallel to the airflow or otherwise reduces the amount of drag/resistance caused by the vanes 1104 through the core air intake 424. As such, air can flow between the vanes 1104 and through the core air intake 424 to the first compressor 428 (FIG. 9). In FIG. 11B, the vanes 1104 have been rotated (e.g., about 90°) to the closed position. In the closed position, the faces of the vanes 1104 are substantially perpendicular to the incoming airflow. In the exemplary embodiment, the vanes 1104 overlap or touch, such that the vanes 1104 substantially block airflow through the core air intake 424 (between the opening 901 (FIG. 9) and the first compressor 428). Any number of vanes 1104 may be used (e.g., 40 vanes).

In the illustrated example of FIGS. 11A and 11B, each of the vanes 1104 has a journal 1110 (one of which is referenced in FIGS. 11A and 11B) that extends through the outer radial wall 1100. The damper 900 further includes a plurality of arms 1112 coupled between respective ones of the vanes 1104 (e.g., at the journals 1110) and an actuation ring 1114. The actuation ring 1114 is disposed around the outside of the outer radial wall 1100. The arms 1112 are pivotably coupled to the actuation ring 1114. When the actuation ring 1114 rotates (e.g., spins around the outer radial wall 1100), the arms 1112 rotate the respective vanes 1104 and, thus, all of the vanes 1104 are rotated simultaneously. As shown in FIGS. 11A and 11B, the damper 900 includes an actuator 1116 coupled to the actuation ring 1114. The actuator 1116, when activated, rotates the actuation ring 1114 in one direction or the opposite direction to rotate the vanes 1104 between the open position (FIG. 11A) and the closed position (FIG. 11B). Thus, the vanes 1104 are movable between the open and closed positions simultaneously by the actuator 1116. In some examples, the actuator 1116 is a hydraulic actuator. The hydraulic actuator may use the aircraft fuel as working fluid, for example. In other examples, the actuator 1116 can be implemented as another type of actuator, such as an electric actuator. The actuator 1116 is controlled by the controller 902 (FIG. 9).

While in the illustrated example one actuator is used to simultaneously move all of the vanes 1104, in other examples, multiple actuators may be used to move the vanes 1104 individually or in subsets. Also, in other examples, the vanes can be hingeably coupled at their tops or bottoms to the outer radial wall 1100 or the inner radial wall 1102. In such examples, the vanes are pivoted by an actuator into the passageway between the outer radial wall 1100 and the inner radial wall 1102 to block the core air intake 424.

Referring back to FIG. 9, in an example operation, the controller 902 receives an input signal 904 requesting to close the damper 900. The input signal 904 can be from a pilot in the cockpit 225, for example. For instance, after the hybrid propulsion engine 400 changes from the first mode of operation to the second mode of operation, the pilot may input a command or request to close the damper 900 (which increases the efficiency of the electric motor 406). In other examples, once the hybrid propulsion engine 400 has successfully changed from the first mode of operation to the second mode of operation, the controller 902 may automatically attempt to close the damper 900.

Before closing the damper 900, the controller 902 checks one or more state-change parameters to verify whether the state change can occur. The controller 902 may compare the state-change parameter(s) to one or more threshold(s). For example, one state-change parameter can be based on the revolutions-per-minute (RPM) of the gas turbine engine 402 (e.g., the RPM of first drive shaft 418). If the RPMs are above a threshold RPM, the controller 902 prohibits closing the damper 900. In some instances, this prevents surging that may otherwise occur if the damper 900 is closed too early. Another state-change parameter can include a temperature of the gas turbine engine 402. For example, the controller 902 can prohibit closing the damper 900 if the engine temperature is above a threshold temperature. Another state-change parameter can be a time limit. In other words, the controller 902 ensures the gas turbine engine 402 is shut down for a period of time before closing the damper 900. This allows sufficient time for the internal components of the gas turbine engine 402 (e.g., the compressor(s), the turbine(s), etc.) to slow down and cool before closing the damper 900. In still other examples, the state-change parameter(s) may include one or more other parameters (e.g., whether fuel supply is off, whether sufficient power is being supplied by the electric motor 406, etc.).

If the state-change parameter(s) is/are not satisfied (e.g., the parameter(s) do not meet the threshold(s)), the controller 902 generates an alert signal 906, which can be sent to the cockpit 225 to be displayed to a pilot or other aircraft personnel. In such an example, the state-change does not occur and the damper 900 remains in the open state (and, thus, the core air intake 424 remains open). If the state-change parameter(s) is/are satisfied (e.g., the parameter(s) do meet the threshold(s)), the controller 902 sends a command signal 908 (e.g., a close command) to the actuator 1116 to close the vanes 1104.

Conversely, before switching from the second mode of operation to the first mode of operation, the damper 900 is required to be opened. The controller 902 verifies that one or more state-change parameters are satisfied before sending a command to the actuator 1116 to open the damper 900. In some examples, prior to starting the gas turbine engine 402, the damper 900 is opened to enable the core (e.g., the compressor(s), the turbine(s), etc.) to start windmilling. Then, fuel is provided to the gas turbines engine 402 and ignition occurs. Therefore, in some examples, the windmilling can be used in an engine-start operation to start the rotation of the core. This windmilling technique can be used in addition to or as an alternative to the starter.

In some examples, the damper 900 can be moved to a partially open state, which is between the closed state and the open state. For example, in some instances, the gas turbine engine 402 may not be completely turned off while in the second mode of operation. Instead, the gas turbine engine 402 can be operated (e.g., periodically) at a low speed, such as idle. In such an example, the damper 900 can be partially opened. For example, the vanes 1104 can be rotated to a partially opened position (e.g., about 45°) between the opened position (FIG. 11A) and the closed position (FIG. 11B). In the partially opened position, the damper 900 prevents some airflow from entering the core air intake 424, but also allows sufficient airflow to enter the core air intake 424 for combustion in the gas turbine engine 402. Operating the gas turbine engine 402, even at idle, can help decrease ice buildup on the hybrid propulsion engine 400 (including the damper 900) by circulating oil through the gas turbine engine 402. With the gas turbine engine 402 running, the oil in in the gas turbine engine 402 continues to circulate, which keeps the oil warm and, thus, helps keep the components of the gas turbines engine 402 and/or the damper 900 warm. The gas turbine engine 402 can be turned on and off as desired to prevent ice buildup. The gas turbines engine 402 can be turned on at a set time interval (e.g., every 20 minutes), for example, or can be turned on based on one or more triggers (e.g., based on a temperature of the oil, based on a determination that ice is accumulating, based on a need for additional power, etc.). Also, by allowing the gas turbine engine 402 to operate (even at a low speeds), the gas turbine engine 402 can continue to be used for powering one or more systems of the aircraft, such as for providing air to the cabin (e.g., via an environmental control system (ECS), for producing electrical power (e.g., for charging the battery 214 (FIG. 2)), for producing hydraulic pressure, etc. Further, with the gas turbines engine 402 operating, the gas turbine engine 402 is ready for quicker power-up should higher power be desired. In an example flight, the gas turbine engine 402 may be operated during the beginning part of cruise until the battery 214 (FIG. 2) is fully charged. Then, the gas turbine engine 402 may be shut down. Then, near the end of cruise, the gas turbine engine 402 is started to enable the gas turbine engine 402 to warm up and prepare for full power, should more power be desired.

In other examples, instead of starting the engine, the damper 900 remains in the closed state and a starter or auxiliary motor can be used to rotate the spool(s) (e.g., the first drive shaft 418) of the gas turbine engine 402, which helps circulate oil to keep the engine warm. Additionally or alternatively, a separate heater (e.g., an electric heater) can be provided to heat the oil and/or the damper. While the damper 900 is shown and described in connection with hybrid propulsion engine 400, it is understood that the damper 900 may be used with other types of aircraft engines.

Figure 10:
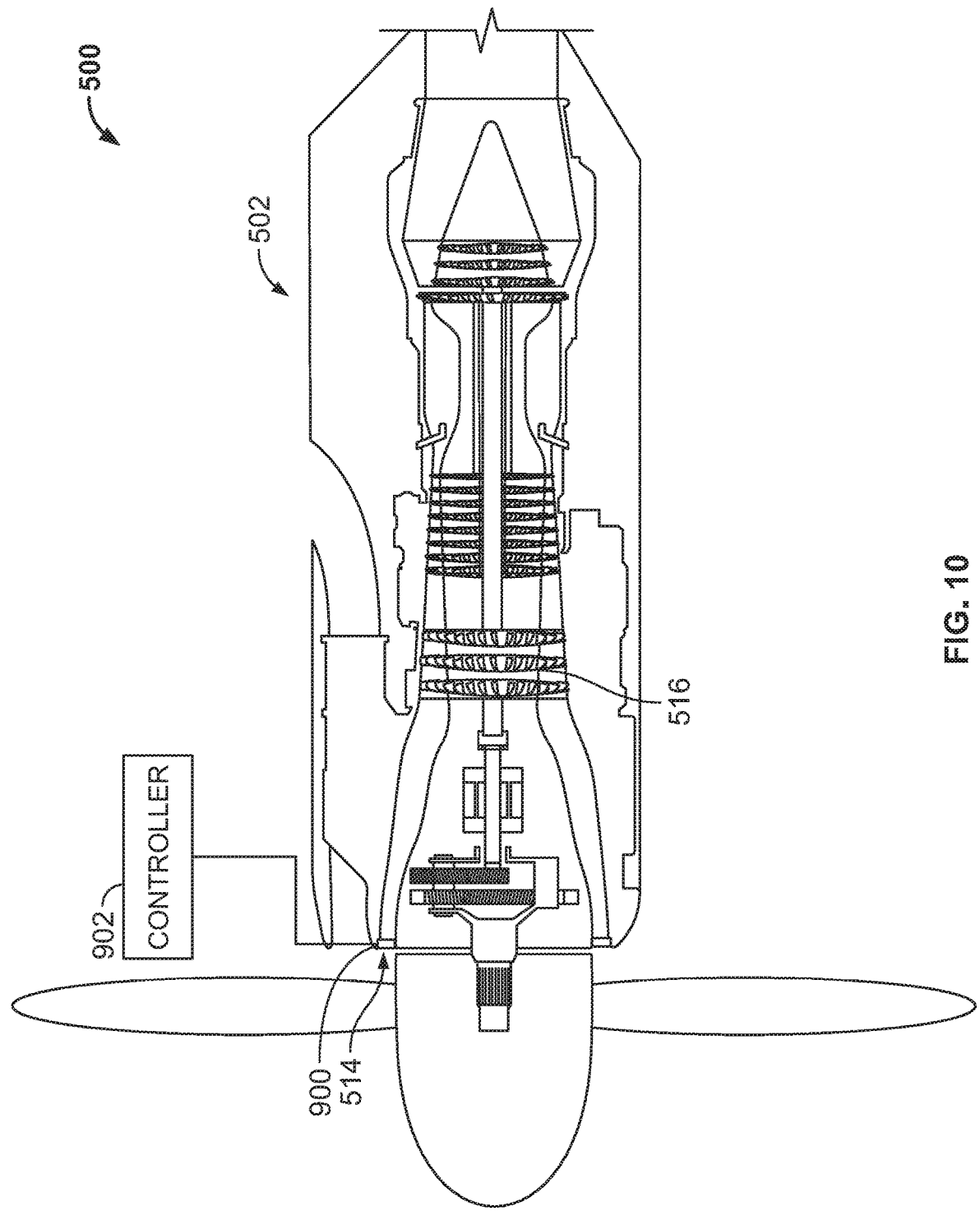
FIG. 10 illustrates the example core damper of FIG. 9 implemented in connection with the example hybrid propulsion engine of FIG. 5.

Now referring to FIG. 10, FIG. 10 shows an example of the core damper 900 being used with the hybrid propulsion engine 500 (the turboprop engine). The core damper 900 is disposed within the core air intake 514 of the gas turbine engine 502 and operates substantially the same as disclosed above to allow or block airflow through the core air intake 514 to the first compressor 516. Thus, to avoid redundancy, a description of the operations is not provided again in connection with FIG. 10. Instead, the interested reader is referred back to description above in connection with FIG. 9 for a full written description of the operations.

Figure 12A:
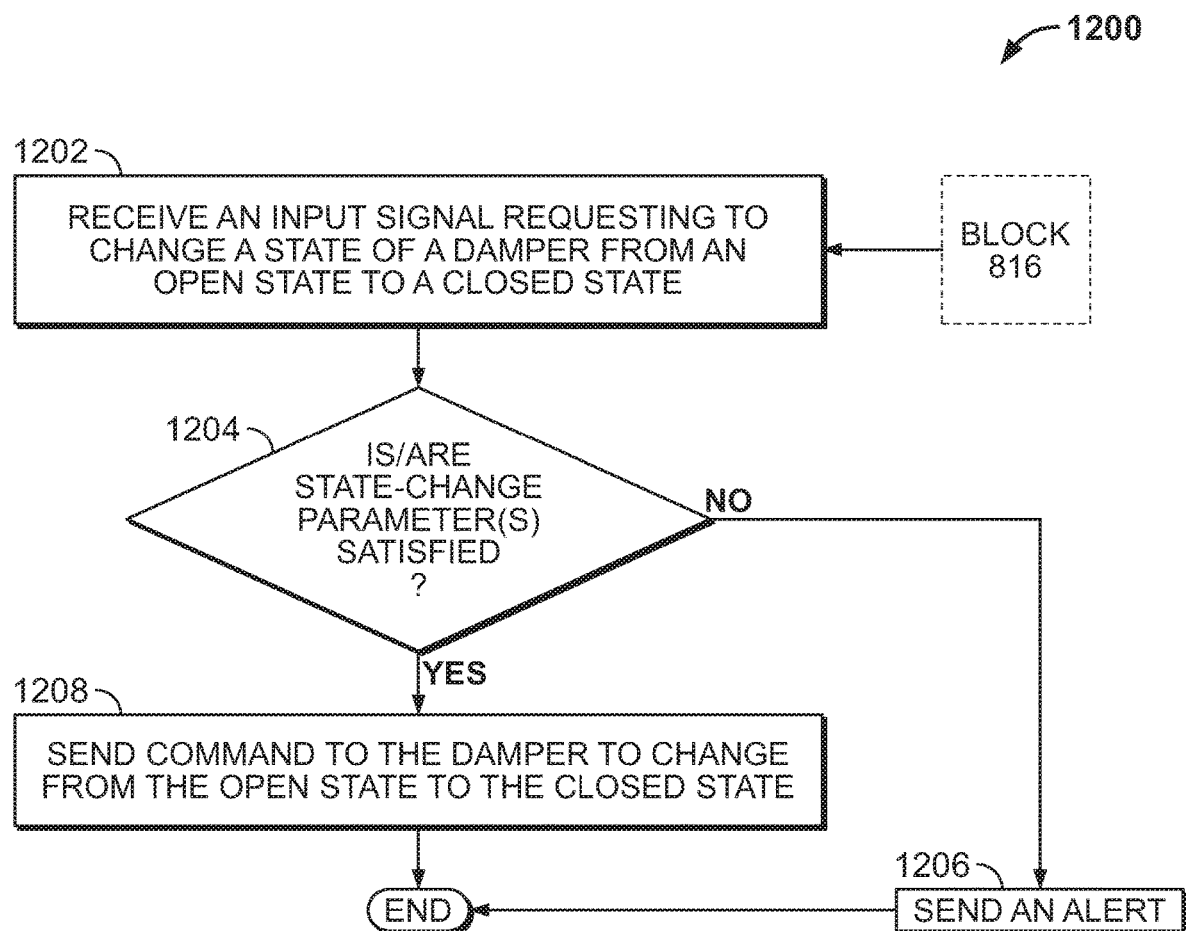
FIG. 12A is a flowchart representative of an example method of operating a core damper from an open state to a closed state and which can be implemented by the hybrid propulsion engines of FIGS. 9 and 10.

FIG. 12A is a flowchart of an example method 1200 of changing a state of a core damper from an open state to a closed state. The method 1200 is described in connection with the hybrid propulsion engine 400 of FIG. 9, which is a turbofan type of hybrid propulsion engine. However, it is understood that the method 1200 can be similarly implemented using other types of hybrid propulsion engines having core dampers, such as the hybrid propulsion engine 500 of FIG. 10. The method 1200 can be performed at least in part by the controller 208 (FIG. 2) and/or the controller 902 (FIG. 9).

At block 1202, the controller 902 receives the input signal 904 (e.g., a first input signal) requesting to change the state of the damper 900 from the open state (FIG. 11A) to the closed state (FIG. 11B). The input signal 904 can be generated by a pilot in the cockpit 225 (e.g., by operating a button or switch). In other examples, the input signal 904 is generated by an auto-pilot program. In some examples, after block 816 from FIG. 8A, the controller 902 receives the request to close the damper 900 from the pilot or an auto-pilot program. In other words, after the mode change occurs from the first mode of operation to the second mode of operation, a request can be generated to close the damper 900.

At block 1204, the controller 902 determines whether one or more state-change parameter(s) is/are satisfied. The state-change parameter(s) can include one or more of the temperature of the gas turbine engine 402, the RPM of the gas turbine engine 402, the temperature of the core, a specified time limit, etc. The state-change parameter(s) can be based on information received from the status signals 226, 228 (FIG. 2), for example.

If the state-change parameter(s) is/are not satisfied (determined at block 1204), the controller 208 generates the alert signal 906 at block 1206, and the example method 1200 ends. The alert signal 906 can be sent back to the cockpit 225, for example, and displayed to the pilot or another aircraft personnel. In this event, the damper 900 does not change states. Instead, the damper 900 remains open. For example, if the controller 902 determines the RPM of the gas turbine engine 402 is above an RPM threshold, the controller 902 generates an alert and the damper 900 remains open. The controller 902 may recheck the state-change parameter(s) after a period of time (e.g., one minute).

If the state-change parameter(s) is/are satisfied, the controller 902, at block 1208, sends the command signal 908 (e.g., a first command signal) to the damper 900 to change from the open state to the closed state. For example, the controller 902 activates the actuator 1116 to rotate the vanes 1104 from the open position to the closed position. Once the damper 900 is closed, airflow from the fan duct 412 is blocked from flowing through the core air intake 424 and into the core, which prevents windmilling and reduces or eliminates wasted airflow. In other words, more airflow remains in the fan duct 412 for producing forward thrust and is not wasted by windmilling the components of the gas turbine engine 402. The change from the open state other closed state occurs while the hybrid propulsion engine 400 is operating in in the second mode of operation, where the gas turbine engine 402 is off and/or otherwise not driving the fan 404 to produce thrust. After block 1208, the example method 1200 ends.

Figure 12B:
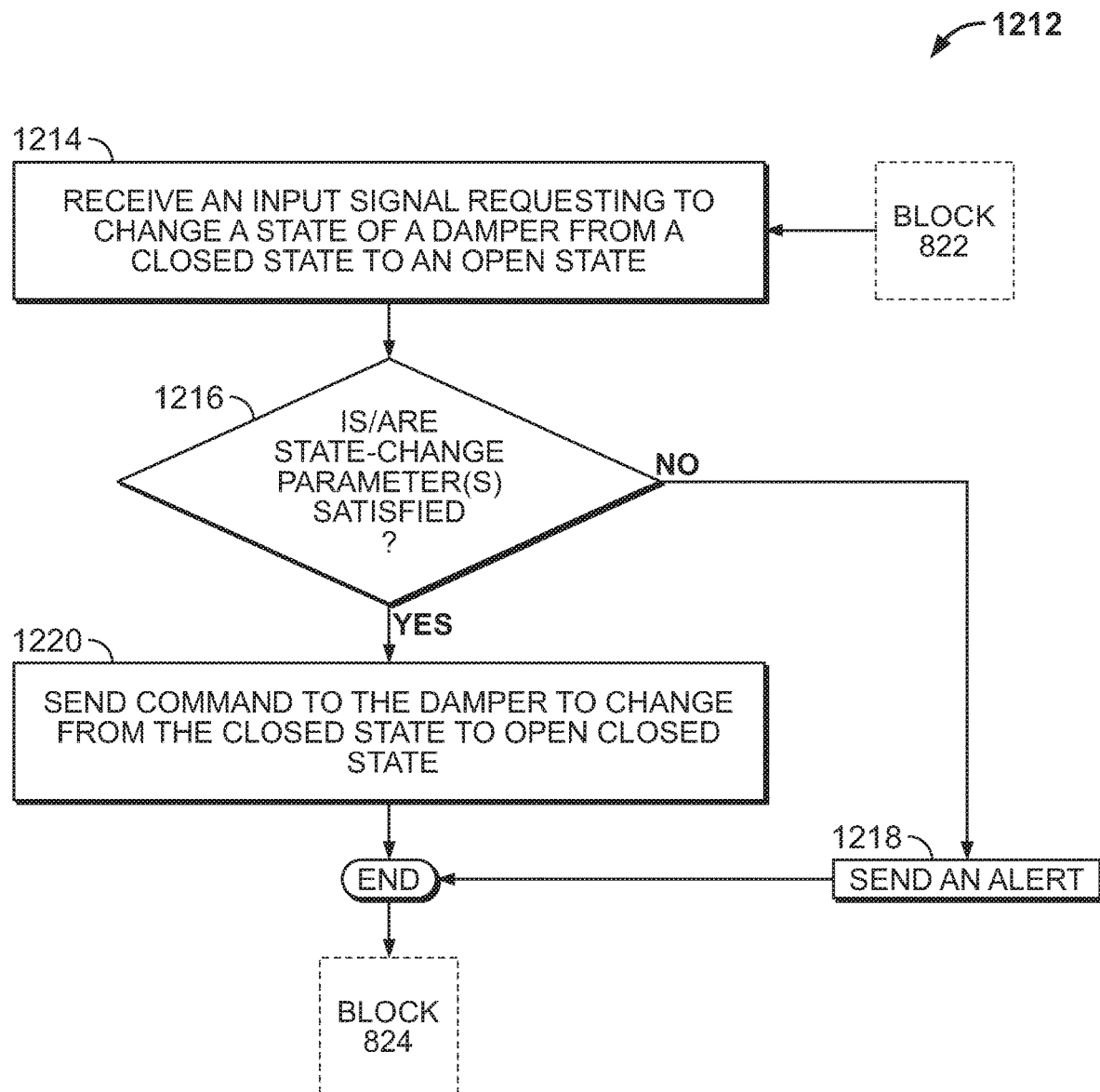
FIG. 12B is a flowchart representative of an example method of operating a core damper from a closed state to an open state and which can be implemented by the hybrid propulsion engines of FIGS. 9 and 10.

FIG. 12B is a flowchart of an example method 1212 of operating a core damper from an open state to a closed state. The method 1200 is described in connection with the hybrid propulsion engine 400 of FIG. 9, which is a turbofan type of hybrid propulsion engine. However, it is understood that the method 1200 can be similarly implemented using other types of hybrid propulsion engines having core dampers, such as the hybrid propulsion engine 500 of FIG. 10. The method 1212 can be performed at least in part by the controller 208 (FIG. 2) and/or the controller 902 (FIG. 9).

At block 1214, the controller 902 receives the input signal 904 (e.g., a second input signal) requesting to change the state of the damper 900 from the closed state (FIG. 11B) to the closed state (FIG. 11A). The input signal 904 can be generated by a pilot in the cockpit 225 (e.g., by operating a button or switch) and/or by an auto-pilot program. In some examples, after block 822 from FIG. 8B, the controller 902 receives the request to close the damper 900. In other words, after the controller 208 receives the request to switch from the second mode of operation back to the first mode of operation, the controller 902 receives a request to open the damper 900 (prior to starting the gas turbine engine 402).

At block 1216, the controller 902 determines whether one or more state-change parameter(s) is/are satisfied. The state-change parameter(s) can be based on information received from the status signals 226, 228 (FIG. 2), for example.

If the state-change parameter(s) is/are not satisfied (determined at block 1216), the controller 208 generates the alert signal 906 at block 1218, and the example method 1212 ends. The alert signal 906 can be sent back to the cockpit 225, for example, and displayed to the pilot or another aircraft personnel. In this event, the damper 900 does not change states. Instead, the damper 900 remains closed.

If the state-change parameter(s) is/are satisfied, the controller 902, at block 1220, sends the command signal 908 to the damper 900 to change from the closed state to the open state. For example, the controller 902 activates the actuator 1116 to rotate the vanes 1104 from the closed position to the open position. Once the damper 900 is open, air from the fan duct 412 flows through the core air intake 424 and into the core. The change from the closed state to the open state occurs while the hybrid propulsion engine 400 is operating in the second mode of operation, in which the gas turbine engine 402 is off and/or otherwise not driving the fan 404 to produce thrust.

After block 1208, the example method 1200 ends or continues to block 824 of FIG. 8B, where the controller 208 continues to verify whether the mode-change parameter(s) are satisfied before starting the gas turbines engine. In some examples, one of the mode-change parameter(s) is the state of the damper 900. For example, if the damper 900 is not opened, the controller 208 may prevent the gas turbine engine from starting. Otherwise, if the damper 900 is opened, the controller 208 may send a command signal (e.g., a third command signal) to start the gas turbine engine 402.

In some examples, as disclosed above, the damper 900 can be moved to a partially open state, and the gas turbine engine 402 can be operated at a low power or speed while the electric motor 406 is still driving the fan 404. By operating the gas turbine engine 402, even at a low speed, the gas turbine engine 402 can be used for producing heat (e.g., reducing ice buildup), producing air for the cabin, for producing electrical power, for preparing the gas turbine engine 402 to be powered-up, etc. For example, while operating in the second mode of operation during cruise, the controller 902 can send a command signal to the damper 900 to move to a partially open state. Then, the controller 902 can send a command signal to start the gas turbine engine 402, which can then be used to help produce heat and/or provide power to one or more aircraft systems. Alternatively, the damper 900 can remain closed, and the controller 902 may control a starter of the gas turbines engine 402 to periodically drive the spools (e.g., the first and/or third drive shafts 418, 434) of the gas turbine engine 402 to keep the oil moving and remain warm. In still other examples, the controller 902 may operate an electric heater to keep the oil and/or the damper warm. For example, an electric heater may be disposed on or adjacent the damper 900.

From the foregoing, it will be appreciated that example hybrid propulsion engines have been disclosed that enable the use of one or both of a gas turbine engine and an electric motor to produce more efficient flight. In particular, using an electric motor during certain flight segments can significantly increase the overall efficiency of a flight. Further, by using an electric motor during certain flight segments, such as cruise, smaller, lighter gas turbine engines can be implemented, which reduces the weight to the aircraft and, thus, increases the overall efficiency of the aircraft.

Example core dampers have also been disclosed that isolate the gas turbine engine while the electric motor is being used. Thus, more of the air accelerated by the propulsor is used to produce forward thrust, thereby increasing the efficiency of the engine.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A hybrid propulsion engine for an aircraft, the hybrid propulsion engine comprising:
   a propulsor;
   a gas turbine engine to drive the propulsor during a first mode of operation, the gas turbine engine having a core air intake;
   an electric motor to drive the propulsor during a second mode of operation;
   an overrunning clutch disposed between the gas turbine engine and the electric motor; and
   a damper disposed in the core air intake of the gas turbine engine to block airflow through the core air intake during the second mode of operation.

2. The hybrid propulsion engine of claim 1, wherein the damper is operable between an open state that allows airflow through the core air intake and a closed state that blocks airflow through the core air intake.

3. The hybrid propulsion engine of claim 1, wherein the core air intake is defined by an outer radial wall and an inner radial wall, and wherein the damper includes a plurality of vanes between the outer radial wall and the inner radial wall.

4. The hybrid propulsion engine of claim 3, wherein the damper includes an actuator to rotate the vanes.

5. The hybrid propulsion engine of claim 3, wherein the vanes are rotatable about axes extending radially from a center axis of the core air intake.

6. The hybrid propulsion engine of claim 3, wherein, in a closed state, the vanes overlap in an axial direction such that the vanes block airflow through the core air intake.

7. The hybrid propulsion engine of claim 1, wherein the propulsor is a fan, and wherein the gas turbine engine and the fan form a turbofan engine.

8. The hybrid propulsion engine of claim 1, wherein the propulsor is a propeller, and wherein the gas turbine engine and the propeller form a turboprop engine.

9. A hybrid propulsion engine for an aircraft, the hybrid propulsion engine comprising:

a propulsor;
a gas turbine engine to drive the propulsor during a first mode of operation, the gas turbine engine having a core air intake defined by an outer radial wall and an inner radial wall;
an electric motor to drive the propulsor during a second mode of operation; and
a damper disposed in the core air intake of the gas turbine engine to block airflow through the core air intake during the second mode of operation, the damper including:
 a plurality of vanes between the outer radial wall and the inner radial wall;
 an actuation ring disposed around the outer radial wall;
 a plurality of arms coupled between respective ones of the vanes and the actuation ring; and
 an actuator to rotate the actuation ring to rotate the vanes simultaneously.

10. A method comprising:
receiving, at a controller, an input signal requesting to change a state of a damper from an open state to a closed state, the damper being disposed in a core air intake of a gas turbine engine, the gas turbine engine being part of a hybrid propulsion engine including an electric motor, a propulsor, and an overrunning clutch disposed between the gas turbine engine and the electric motor, the gas turbine engine to drive the propulsor during a first mode of operation, the electric motor to drive the propulsor during a second mode of operation;
determining, via the controller, whether one or more state-change parameters are satisfied; and
sending, via the controller, a command signal to move the damper from the open state to the closed state based on the determination that the one or more state-change parameters are satisfied, wherein, in the closed state, the damper is to block airflow through the core air intake during the second mode of operation.

11. The method of claim 10, wherein the controller is to send the command signal while the hybrid propulsion engine is operating in the second mode of operation.

12. The method of claim 10, wherein the input signal is a first input signal and the command signal is a first command signal, the method further including:
receiving, at the controller, a second input signal requesting to change the state of the damper from the closed state to the open state; and
while the hybrid propulsion engine is operating in the second mode of operation, sending, via the controller, a second command signal to move the damper from the closed state to the open state.

13. The method of claim 12, further including, after the damper is moved to the open state, sending, via the controller, a third command signal to start the gas turbine engine to switch the hybrid propulsion engine from the second mode of operation to the first mode of operation.

14. The method of claim 10, wherein the command signal is a first command signal, further including:
sending, via the controller, a second command signal to move the damper to a partially open state between the closed state and the open state; and
while the hybrid propulsion engine is operating in the second mode of operation, sending, via the controller, a third command signal to start the gas turbine engine to at least one of produce heat or provide power to one or more aircraft systems.

15. The method of claim 10, wherein the damper includes a plurality of vanes disposed in the core air intake, and wherein the command signal is to activate an actuator to rotate the vanes from an open position in which the vanes allow airflow through the core air intake to a closed position in which the vanes block airflow through the core air intake.

16. The method of claim 10, wherein the one or more state-change parameters include at least one of a temperature of the gas turbine engine or a revolutions-per-minute (RPM) of the gas turbine engine.

17. An aircraft comprising:
a hybrid propulsion engine including:
 a propulsor;
 a gas turbine engine operatively coupled to the propulsor, the gas turbine engine having a compressor and a core air intake to direct air into the compressor, the gas turbine engine to drive the propulsor during a first mode of operation;
 an electric motor operatively coupled to the propulsor, the electric motor to drive the propulsor during a second mode of operation;
 an overrunning clutch disposed between the gas turbine engine and the electric motor; and
 a damper disposed in the core air intake, the damper operable between an open state to allow airflow into the compressor during the first mode of operation and a closed state to block airflow into the compressor during the second mode of operation.

18. The aircraft of claim 17, wherein the core air intake is defined by an outer radial wall and an inner radial wall, and wherein the damper includes a plurality of vanes between the outer radial wall and the inner radial wall.

19. The aircraft of claim 18, wherein the vanes are rotatable between an open position that allows airflow between the vanes and a closed position that blocks airflow between the vanes.

20. The aircraft of claim 18, wherein the damper includes an actuator to rotate the vanes simultaneously.

* * * * *